United States Patent
Vazquez Gomez

(10) Patent No.: US 12,454,475 B2
(45) Date of Patent: Oct. 28, 2025

(54) ENGINES STRUCTURE FOR WATER MOLECULES IMPULSE, ORDER AND CONTROL FOR AGRICULTURE PURPOSES

(71) Applicant: Rafael Vazquez Gomez, Tijuana (MX)

(72) Inventor: Rafael Vazquez Gomez, Tijuana (MX)

( * ) Notice: Subject to any disclaimer, the term of this patent is extended or adjusted under 35 U.S.C. 154(b) by 0 days.

(21) Appl. No.: 18/391,309

(22) Filed: Dec. 20, 2023

(65) Prior Publication Data
US 2024/0239696 A1    Jul. 18, 2024

Related U.S. Application Data

(63) Continuation of application No. 16/428,653, filed on May 31, 2019, now Pat. No. 11,858,834.

(60) Provisional application No. 62/678,819, filed on May 31, 2018.

(51) Int. Cl.
*C02F 1/48* (2023.01)
*H01F 7/20* (2006.01)
*A01G 25/00* (2006.01)

(52) U.S. Cl.
CPC .............. *C02F 1/484* (2013.01); *C02F 1/485* (2013.01); *H01F 7/20* (2013.01); *A01G 25/00* (2013.01)

(58) Field of Classification Search
CPC . C02F 1/484; C02F 1/485; H01F 7/20; A01G 25/00; A01G 7/04
See application file for complete search history.

(56) References Cited

U.S. PATENT DOCUMENTS

| | | | | |
|---|---|---|---|---|
| 5,138,172 A | * | 8/1992 | Kropp | C05G 1/00 250/492.1 |
| 11,172,779 B1 | * | 11/2021 | Munoz | A47G 33/12 |

FOREIGN PATENT DOCUMENTS

KR    20180054120 A  *  5/2018

* cited by examiner

*Primary Examiner* — Waqaas Ali
(74) *Attorney, Agent, or Firm* — Gary L. Eastman, Esq.; Eastman IP

(57) ABSTRACT

Plant growth and energy storage is supported by complicated bio-electro-chemical processes causing the intake of water and nutrients from the ground. These processes are affected by adaptations such as root structure and genetic characteristics that facilitate a plant species' survival in its native regions. Disclosed are methods for altering the water and nutrient intake through electrical alignment of molecules with dipole characteristics and ionized molecules, and apparatus for performing the disclosed methods. Through the disclosed invention, the capacity of water molecules to interact at an electro-chemical level with soil elements can be increased or reduced to guide absorption-transport activity, facilitating optimal plant growth for agricultural and other purposes.

8 Claims, 34 Drawing Sheets

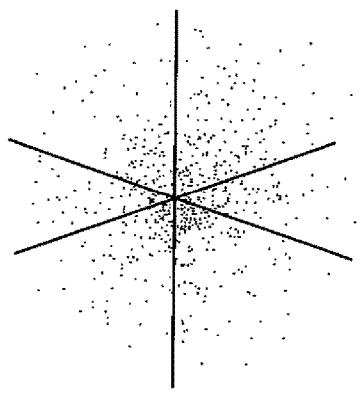
HYDROGEN ATOM
PROBABILITY CLOUD OF ATOMIC ELECTRON ORBITAL
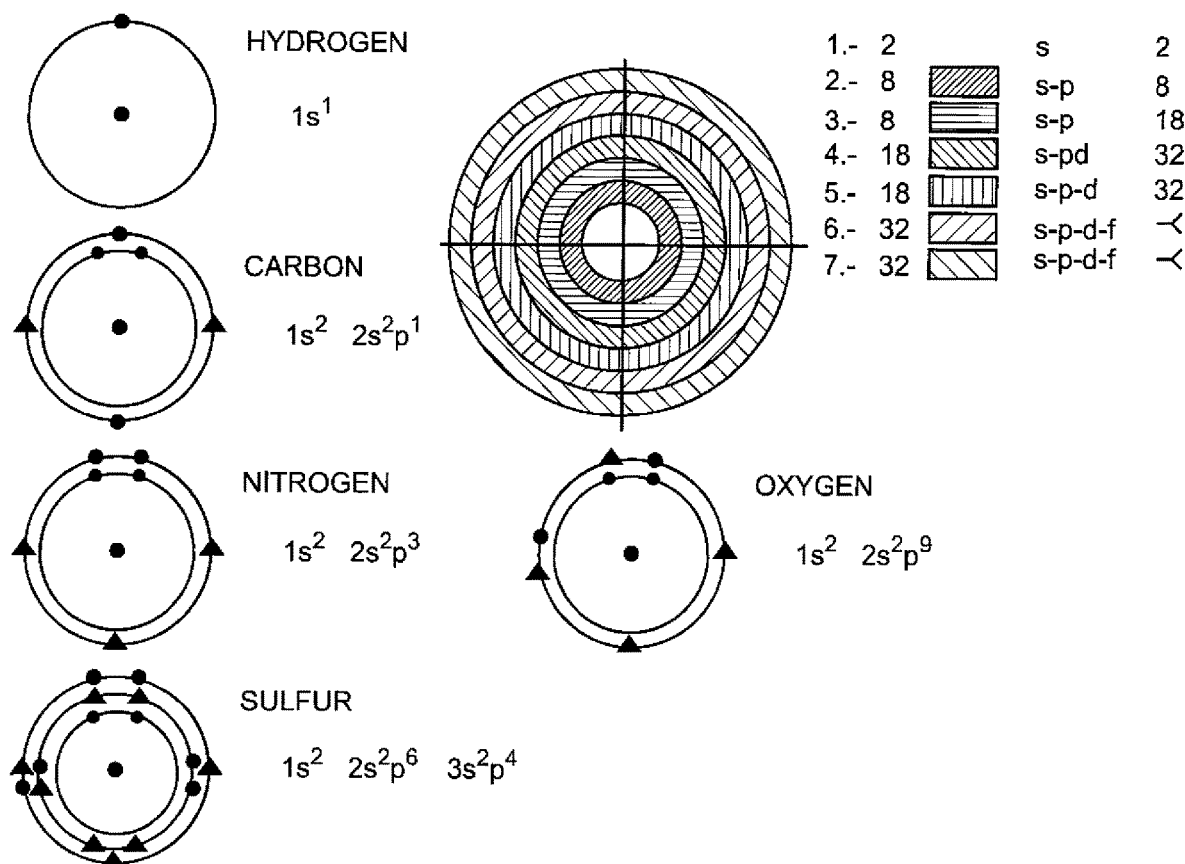
FIG. 10

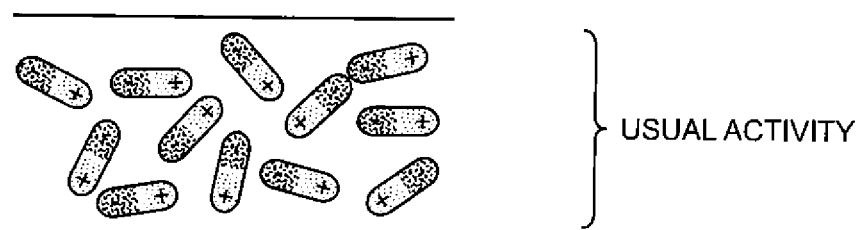
FIG. 16 — USUAL ACTIVITY
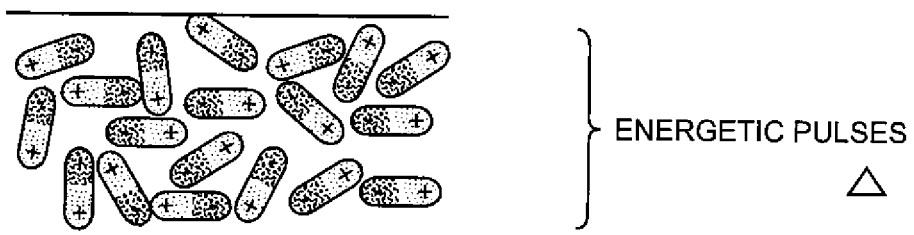
FIG. 16A — ENERGETIC PULSES
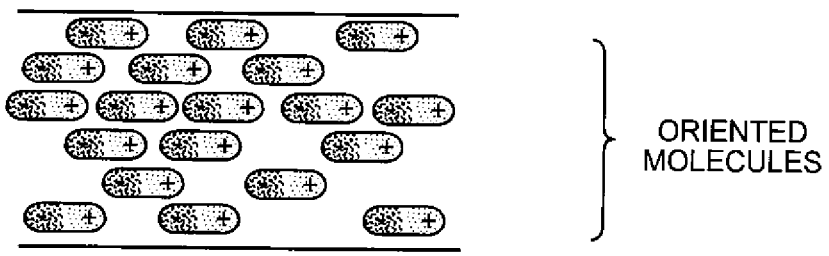
FIG. 16B — ORIENTED MOLECULES
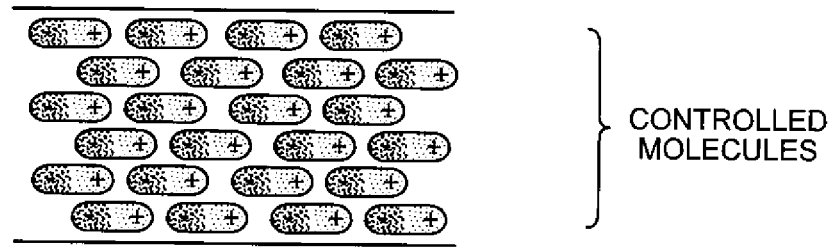
FIG. 16C — CONTROLLED MOLECULES

ROL = REACTIVE OXYGEN LEVEL

SOIL ANALYSIS

SOIL DEEP SAMPLE

| | | |
|---|---|---|
| ANIONS - | -SULFUR | ppm |
| | -PHOSPHOROUS | lbs/Acre |
| CATIONS + | CALCIUM | lbs/Acre |
| | MAGNESIUM | lbs/Acre |
| | POTASSIUM | lbs/Acre |
| | SODIUM | lbs/Acre |
| SATURATION % | CALCIUM | 60 - 70 % |
| | MAGNESIUM | 10 - 20 % |
| | PATASSIUM | 2 - 5 % |
| | SODIUM | 0.5 - 3 % |
| | EXCH HYDROGEN | 20 - 15 % |
| TRACE ELEMENTS | BORON | ppm |
| | IRON | ppm |
| | MANGANESE | ppm |
| | COPPER | ppm |
| | ZINC | ppm |
| | ALUMINUM | ppm |

| MACRONUTRIENTS | TYPICAL FORM | FUNCTION |
|---|---|---|
| NITROGEN N ($-1000$ μmol g$^{-1}$) | NITRATE ($NO_3^-$) AMMONIUM ($NH_3^+$) | PROTEINS, PHOSPHOLIPIDS, NUCLEIC ACIDS, CHLOROPHYLL, CO-ENZYMES, PHOTOHORMONES, SECONDARY METABOLITES |
| POTASSIUM K ($-250$ μmol g$^{-1}$) | $K^+$ CATION | ENZYME ACTIVATION, PROTEINS, REGULATION OF STOMATAL APERTURE, PHLOEM TRANSPORT (LOADING) STRESS RESISTANCE |
| CALCIUM Ca ($-125$ μmol g$^{-1}$) | $Ca^+$ CATION CALCIUM CARBONATE $CaCO_3$ CALCIUM SULFATE $CaSO_4$ | CELL WALL STABILISATION, CELL EXTENSION, SECRETORY PROCESS, MEMBRANE STABILIZATION OSMOREGULATIONS |
| MAGNESIUM Mg ($-125$ μmol g$^{-1}$) | $Mg^+$ CATION | CHLOROPHYLL - ENZYME ACTIVATION PHOSPHORYLATION |
| PHOSPHOROUS P ($-60$ μmol g$^{-1}$) | DIHYDROGEN PHOSPHATE $H_2PO_4^-$ MONOHYDROGEN PHOSPHATE $HPO_4^{2-}$ Al, Fe, and Ca PHOSPHATES | ATP (ENERGY TRANSFER) NUCLEIC ACIDS, SUGARS, PHOSPHOLIPIDS, CO-ENZYMES, STARCH |
| SULFUR S ($-30$ μmol g$^{-1}$) | SULFATE $SO_4^{2-}$ | |

FIG. 23

| MICRONUTRIENTS | TYPICAL FORM | FUNCTION |
|---|---|---|
| CHLORINE Cl (~3 µmol g$^{-1}$) | Cl$^-$ ANION | ROLE IN PHOTOSYNTHETIC OXYGEN PRODUCTION OSMOREGULATION |
| BORON Bo (~2 µmol g$^{-1}$) | HYDROGEN BORATE H$_3$BO$_3$ HYDROGEN BORATE BO$_3$$^{3-}$ UNDISSOCIATED BORON (B(OH)$_3$) | ROLE IN CELL WALL STRUCTURE, MEMBRANE FUNCTION, REPRODUCTIVE GROWTH AND DEVELOPMENT. ROLE IN ROOT ELONGATION AND SHOOT GROWTH |
| IRON Fe (~2 µmol g$^{-1}$) | FERRIC CATIONS Fe$^{3+}$ FERRIC CATIONS Fe$^{2+}$ | CHLOROPHYL SYNTHESIS, PROTEINS, ENZYMES |
| MANGANESE Mn (~2 µmol g$^{-1}$) | Mn$^{3+}$, Mn$^{2+}$, Mn$^{4+}$ CATIONS | ENZYMES CO-FACTOR TO ENZYMES PHOTOSYNTHETIC OXYGEN PRODUCTION |
| ZINC Zn (~0.3 µmol g$^{-1}$) | Zn$^+$ CATION | COMPONENT OF ENZYMES, ACTIVATION OF ENZYME PROTEIN SYNTHESIS, CARBOHYDRATE METABOLISM |
| COPPER Cu (~0.1 µmol g$^{-1}$) | CUPRIC ION Cu$^{2+}$ LOW MOLECULAR WEIGHT HUMIC AND FULVIC ACIDS | PROTEIN LIQUIFICATION, POLLEN FORMATION, FERTILISATION |
| NICKEL Ni (~0.001 µmol g$^{-1}$) | Ni$^{2+}$ CATION | COMPONENT OF ENZYMES - NITROGEN METABOLISM |
| MOLYBAENUM (~0.001 µmol g$^{-1}$) | MOLYBDATE ANION MoO$_4$$^{2-}$ | ENZYME FOR NITROGEN FIXATION, COMPONENT OF ENZYMES AND ENZYME CO-FACTORS |

FIG. 24

EINSTEIN ATOM PERMANENT MOTION VERIFICATION

ELECTRO-MAGNETIC WAVES DISTORTION

INTENSITY
TIME
ENVIRONMENT ⟶ DIALECTRIC STRUCTURES $$\hat{H}|\Psi\rangle = E|\Psi\rangle$$

$$\left[\frac{-\hbar^2}{2\mu}\nabla^2 + V(r)\right]\Psi(r) = E\Psi(r)$$

WAVE-TIME INDEPENDENT

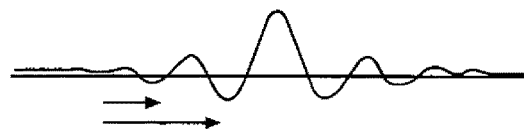
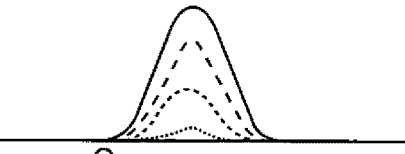

$$i\hbar\frac{d}{dt}|\Psi(t)\rangle = \hat{H}|\Psi(t)\rangle$$

$$i\hbar\frac{\partial}{\partial t}\Psi(r,t) = \left[\frac{-\hbar^2}{2\mu}\nabla^2 + V(r,t)\right]\Psi(r,t)$$

WAVE-TIMEDEPENDENT
(QUANTUM MECHANICS EQUATION ⟶ SCHRÖDINGER)

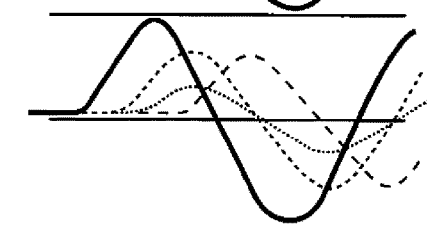

STRUCTURE OF ATOMS AND MOLECULES AND THEIR REACTIONS WITH EACH OTHER UNDERLINE ALL PHYSIC-CHEMISTRY AND BIOLOGY SCHEME - BUT THE QUANTUM-MECHANICS BASIS

FEYNMAN'S SPACE-TIME POSSIBLE PATHS

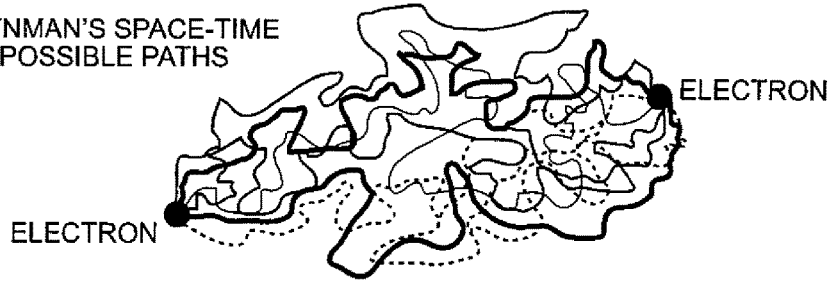

FIG. 30

ELECTRICAL WAVE ACTION

PHOTON ENERGY

WAGE REPRODUCTIVITY ACTION
ELECTRON NEW ACTIVITY LINES

FREYMAN'S SPACE-TIME POSSIBLE PATH

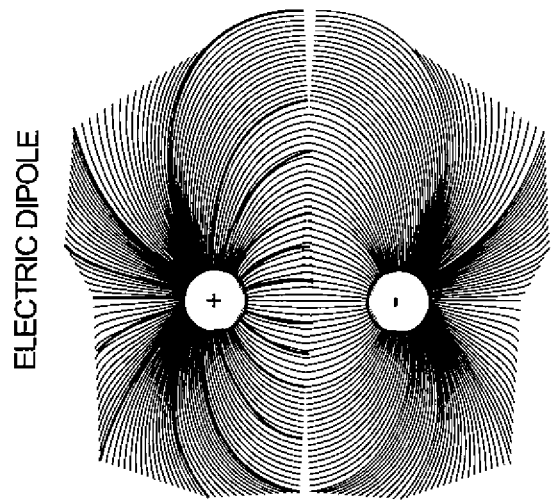
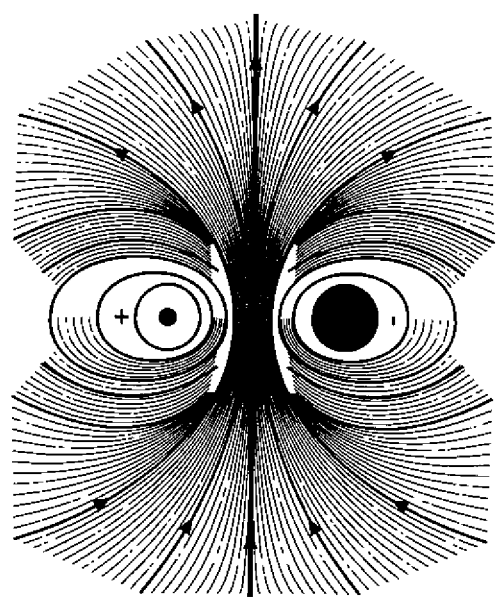
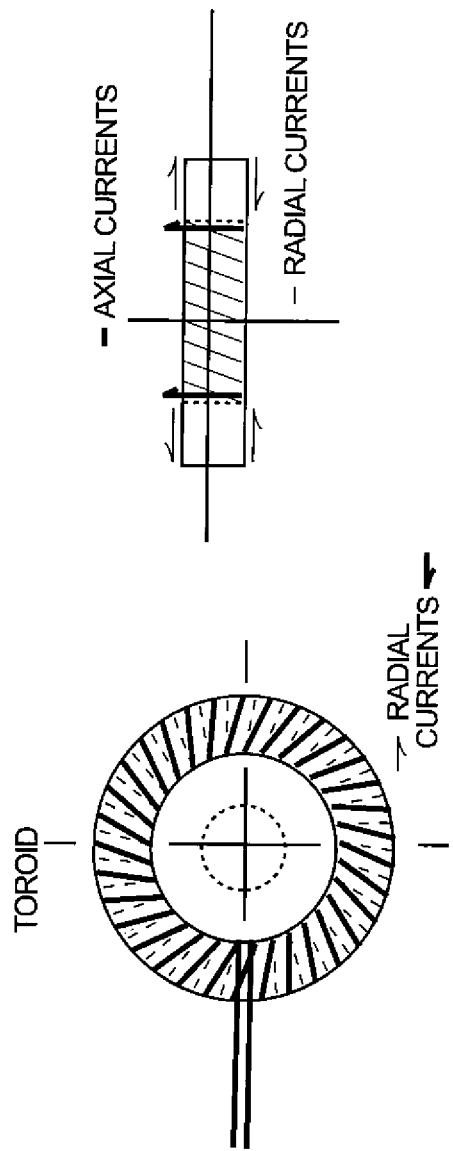
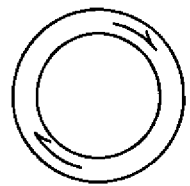
FIG. 33A
FIG. 33B

ENGINES STRUCTURE FOR WATER MOLECULES IMPULSE, ORDER AND CONTROL FOR AGRICULTURE PURPOSES

RELATED APPLICATION

This application is a continuation of U.S. patent application Ser. No. 16/428,653, entitled "Engines Structure for Water Molecules Impulse, Order and Control for Agricultural Purposes," filed May 31, 2019, and currently co-pending, which claims priority to U.S. Provisional Patent Application Ser. No. 62/678,819, entitled "Engines Structure For Water Molecules Impulse, Order and Control For Agricultural Purposes," filed May 31, 2018. The aforementioned related applications are incorporated herein by reference.

BACKGROUND OF THE INVENTION

After the nomadic period, a new sedentary era began but represented a serious challenge for the human communities. New behavior was needed to face complicated problems, including food security and permanent supply, shelter for weather conditions, health and social issues, transportation for people and goods, residential water supply, and handling of waste.

Food supply became the prominent challenge for the entirety of mankind and through centuries they focused on identifying useful plants and fruits, production control, and sequence production utility against weather and unknown environment.

Plants are living creatures with specific living cycle, structured by cells as all living creatures are (FIG. 2). They must perform complicated processes for adaptation to each particular place, food selection, production, reproduction and disposal of their own waste.

Plants adapted to the land environment through thousands of years of evolution but without the movement capacity, making this adaptability a complicated challenge.

Plant structure can be identified as a root system, a trunk and branch system, and a leaf system. Each is noted as a system because every area represents a complicated series of adaptability activities with important influence on survival, production and reproduction performance.

The root system as basic support must be extended on specific design as long as nutrients and water are available. Complicated activities must be coordinated for these purposes since support on soil characteristics (FIG. 3B), water availability and storage, identification of nutritional elements, cell adaptation for absorption selectivity, transport of nutrients and transformation of them as needed, and finally coordination of excretions. All these activities have been selected by thousands of years of genetic structure modification to match with each location environment.

The trunk and branch system is oriented by each plant's genetic code to transport selected nutrients in water-mix solution, coordinate the mix of all these chemical elements to construct their own sugars, proteins, carbohydrates, and hormones as its organism needs (FIG. 4). Their specific cells form different channels (XYLEM and PHLOEM) to achieve absorption and distribution of the nutrients and after these activities, excretion of the transformed elements to the soil; this action eventually modifies the soil composition.

The leaf system's first challenge is to provide a transfer perspiration process, and ultimately to provide oxygen its own cells need to survive. The way root and trunk actions transport water and basic nutrients as solution develops a pump environment to handle and transform all these elements. Leaf design (FIG. 5) shows environment adaptation: respiratory ducts that by hormonal and chemical reaction remain open to let water be excreted after collision with $CO_2$ gases absorbed from the atmosphere.

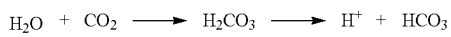

$$H_2O + CO_2 \longrightarrow H_2CO_3 \longrightarrow H^+ + HCO_3$$

These final products are carbonic acid and $H^+$ ion needed to be excreted by roots to transform the soil chemical components. Water itself is transformed $H_2O \rightarrow O + H^+$ $H^+$ ions $\rightarrow OH^- + H^+$. Oxygen is liberated by the leaves and other residuals by the roots. These phenomena depend on the sun's energy and leaf hormones that control the open-close process that leaves perform during the energic daylight hours. Evaporation rate is related to the environmental condition (as dry and sunny conditions correlate to a greater rate) and gives the energy to make the transport of water solution positive access to the entire plant. This process is lower at night because without the sun's energy leaves' pores (stomata) remain closed and reduce the evaporation capability.

When the basic source of water and chemical nutrients is located in a specific area as well as weather and local conditions, genetic adaptation processes develop cell root activities to be performed, including directing contact to identify and select specific elements and nutrients, interacting with ions present (anions and cations) to match with the plant's own excreted, identifying virus, bacteria or fungus—subproducts present in soil after biological degradation creating new chemical molecules for easier root cell activity, and coordinating with the external soil molecules and the residuals of the plant's metabolism.

Each area has specific organic or inorganic elements with its own chemical composition, air and water conditions—and all these represent the raw material for all the plant activities, production and survival.

The structure of the elements needed represent specialized electrochemical characteristics to be assimilated.

For agricultural classification, macronutrients include Carbon, Nitrogen, Hydrogen, Phosphorus, Potassium, Calcium, Sulphur, Iron. Micronutrients include Magnesium, Zinc, Boron, Copper, Molybdenum, Cobalt. Nonessential elements are Sodium, Aluminum, Silicon, Chlorine, and Gallium. The nutrient balance represents the efficiency capacity of the plant because by its own genetic-data each plant improves its own performance.

Absorption of Nitrogen and Sulphur become basic structure material to synthesize vital aminoacids and proteins as occur in other living creatures.

The most important chemical Molecules can't be located everywhere: Nitrate $NO_3$, Ammonium $NH_4$, and Sulphate $SO_4$, and some has to be added to enrich the soil. Each real concentration can frequently fluctuate for location and weather changes.

Molecules found in soil can be organic or inorganic salts (ions) in free state—the release or restoration of these salts ions will keep soil solution in permanent motion until electro-chemical local equilibrium.

The root-cells structure and distribution (FIG. 4) represent the necessary selection and absorption adequate work: Plasma cell-root membrane pumps-out $H^+$ Hydrogen ions that can be combined with SOIL chloride $Cl^-$ anions, when this happens combined molecule uptake is allowed against electro-chemical gradient, at the same time these $H^+$ ions displace K+ (potasium) from the soil-clay particles—been freed these particles can be absorbed through electro-mechanical facilitated diffusion (FIG. 6A).

A number of elements present in the clay soil that surround the root-cell system can be activated and taken-in by specialized external membrane design (FIGS. 4, 6A, 6B).

External cell-wall creates a specialized suction program to complete this absorption phenomenon: Water solution is reassembled and transported to leaves area (xylem transport road), here under adequate weather conditions water is mixed with external $CO_2$ and divided. Oxygen is displaced to the atmosphere and the remaining $H^+$ ions are sent back to the root environment.

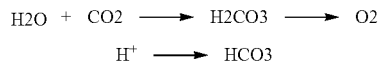

These elements and molecules will be used by each cell performance and the $H^+$ and $HCO_3$ (carbonic acid) to be transported (by phloem) and liberated to the soil environment: $HCO_3$; ions will interact with cations $NH_4$, $K^+$, $Ca_2$, $Mg_2$. $HCO_3^-$ ions will interact with anions $NO_3$, $H_2PO$, $HPO_4$, $Cl^-$ (FIG. 6A).

Each solute combination has a specific chemical process:

Every Nitrate ion reduced to Ammonia—another $OH^-$ is formed, in the way that the plant tries to get pH balance, it must excrete this ion into the soil medium or neutralize it with organic acids. As result the plant-root medium becomes more alkaline every time a Nitrate is absorbed. Every Nitrate ion absorbed must be accompanied by a cation or excretion of another anion.

For example, tomato plants absorb metal ions such as $K^+$, $Na^+$, $Ca^+$ or $Mg_2$ to match every Nitrate taken in and store these as salts of organic acids. Soybean plants instead balance most of $NO_3^-$ absorbed by excreting $OH^-$, $HCO_3^-$ As mentioned before soil frequently includes a number of virus, bacteria and fungi activity that through organic residual degradation, some—inorganic elements activity—produce some polypeptides (VALINOMYCIN, CYCLOSPORIN, NISTALIN, etc.) added into the soil medium. The presence of these biochemicals allow the cell-root system to identify and select specific kinds of ions. Cell membrane select specific ions as needed depending only of the plant genetics and soil weather conditions.

Soil generic components can be organic-residual inorganic compound ions as amino acids, proteins, mono- and polysaccharides, nucleic-acids, all these can be assimilated by the plant as raw material to form own molecules as needed.

As a practical matter for understanding, an ion is an atom or molecule with a net electromagnetic charge through loss or gain of electrons. A cation is an ion with positive electromagnetic charge, and an anion is an ion with negative electromagnetic charge.

Only plant genetic programed proteins (amino-acid chains) can give real explanation to certain specific membrane characteristics such as ion antagonism, specific ion identification and selection for controlled absorption, saturation data and response, and kinetic properties use (basic for the metabolic energy production). Ion uptaking or binding can occur by the presence and action of carrier proteins. These are responsible to select and pick-up the transformed molecules, transport and locate them when each one is needed. After this is completed, the again transformed molecules revert back and repeat the entire phenomenon.

Root cells are in permanent contact with the soil-clay environment where ions such as $K^+$, $Na^+$, S are always found when membrane secretes H+ ions. Displacement phoenomena occur for ions located in clay elements (FIG. 6B).

Ion concentration is not necessarily the same in or outside in clay areas. If there is a non-diffusing negative charge in one side a potential gradient will be formed across the cell membrane from where ions will be diffused (electrochemical equilibrium).

After this electro-mechanical scenario is in place some of the factors are necessary to analyze to clearly understand nutrient-assimilation phenomena:

SOIL AERATION-Most living cells require oxygen as the land root-plants. Oxygen is essential for energy generation as result of the biological oxidative permanent process. Mineral absorption is affected in poor soil aeration—when Roots are subject to anaerobic conditions, survival rate and productivity can be drastically reduced.

TEMPERATURE-Climate fluctuations affect ions in solution in conductivity, which can modify significantly root cell metabolic performance. Lower temperature reduces mineral absorption due to modifications in protein structure and enzymatic activity.

+PH in Soil (Percentage of H IONs)—$H^+$ (Hydrogen) ion concentration in soil regulates the ionization of minerals and other elements present in the soil environment. This presence has an important effect in the ion bond selection as well as the rate level and speed. Proteins involved in the absorption process are very sensitive for pH level around. Soil with high acid or alkaline level are practically useless for agriculture.

ELEMENTS present in SOIL solution-Concentration of minerals and other elements found in soil are not in uniform distribution and most of the time have different dilution rates. This modifies the absorption level of ions which represent the concentration gradient.

ION-ION INTERACTION—A large variety of ions in different concentration are always present in soil solution. Anytime the root cell membrane absorbs nutrients this ion-ion phenomenon occurs. Ions present in a specific area can facilitate change or interfere in the absorption of other kinds of ions (ANION-CATION performance)—antagonism phenomena. Absorption of $K^+$ and $Fe^+$ antagonize with $Mg\pm$ and $Ca\pm$ bivalent ions. Absorption of ($CaCl_2$) antagonize the intake of $Cu_2$ preventing copper toxicity in some plants, especially when additional fertilizer is applied.

Root cells for themselves or by action of external elements (bacteria, virus, fungus, metals—free ions) can interfere with vital plant activities—absorption of selected amount of different ions as their specific metabolism that require dependency on their own genetic performance.

The complete contest of water and nutritional chemical molecules will define permanent coefficient of electrochemical texture useful for the plant, can have better use of dryness or humidity around and improve gradient level of free ions in water.

The effect of water on plants' performance is finally defined by the genetic code of each species (physiological characteristic)—essential for growth and production. Soil water contest represents the main influence on the physical and chemical properties due to the oxygen activity—important activity because of its basic influence on the root breathing—microbiological-virus activity and finally the electro-chemical status.

The chemical potential of water is due to the presence of dissolved substances as well electro-chemical charges involved (soil components and cell membrane relation). Appropriated or inadequate water supply represents loss in absorption capability and ultimate efficiency—because every plant species requires from the soil a specific amount of nutrients and carrier-water that provides its metabolic necessities. Soil water interferes with the matrix and the solutes—and so defines the plant variation for survival and finally is the key reason for the ultimate absorption rate, for stomatal closure (leaves' evaporation door), for osmotic selectivity, and for adjustment for leaves' chemical activity.

Evolution on the plant genetics prevents the fact of survival on water environment (anatomy and size-root area).

The transpiration process transfers to the atmosphere until 90% level of the total absorbed water. This means that the total of the plant capacity is defined by the atmosphere dryness rate, or evaporative demand. This evaporative level through the leaves structure is caused by the pressure gradient between water pressure and the dry air in the total atmosphere. Each plant species can use that water potential as long evolution lets it adapt the ability to capture that available water that carries the solute content (FIGS. 2-3).

The energy needed for this absorption process is balanced by the solute electro-chemical condition available in situ and the water-carrier in soil—this because variation availability can be modified by the electrochemical interchange of ions (anion-cation).

Only each plant species can increase and create the root size for more absorption area. In some cases this root area can be 75% of the total plant area (FIG. 3) as in desert areas.

Then water flow from soil to roots is affected by transpiration, atmospheric variation and the hydraulic soil conductivity. Sandy SOIL may have higher conductivity because of its porosity level, but may retain less amount of water than clay soils or soils rich in organic matter.

Depending on the water-mix contest, absorption can occur on 3 levels in root-cell area: apoplastic—water-mix moves through the intercellular walls and membranes; symplastic—when water-mix moves only from cell to cell relation; and transmembrane—mixed path useful apoplastic or symplastic.

These different options for the electro-chemical conductivity process are defined by genetic plant species, by internal and external temperature—and by the hour of the day (FIG. 9).

Structural cell-wall proteins (LIGNIN-SUBERIN) guide or select that apoplastic or symplastic options—these rates can be adapted by the plant during the day hours. The rate is higher during photo-sun-period where the photo-transpiration dividend is increased.

Water is the perfect solvent and the basic support of the living plants (physiological and chemical) due to its polar structure (FIG. 7-8). The atoms and molecules present in this structure have a direct activity on the dilution—modification over organic metabolites—basic activity for the better plant performance for production and plant survival.

The solutes present in the final water solution will define the absorption process (ENTROPY)—this represents higher osmotic potential and as a result a higher negative water potential.

Subjects for further analysis include the sequence of the plant vascular system, use of extra chemical elements and derivatives, physical and chemical sequence on the absorption process, transport and transmission of absorbed solutes to the entire plant, transpiration phenomena, and performance identity defined by genetics on each plant species.

Electron Activity in Universe

All material around (solid, liquid or gas) is the same basic ingredient in the entire universe. Physical and chemical studies explain the identification of it: the atom. Any material known is single or mixture forming molecules of atoms. Combined, they can explain the limitless substances around.

The scientific community has detailed the basic list of these elements (Periodic Table) with more than 100 units—of this amount only near 90 can be found in nature—the rest can only be organized in labs. This community for chemical studies coordination for this list, and analysis gives the order and guide to understand the basic composition—interaction, identity and quality characteristics of each one, safety for handling, capability and technical advice of its use and mix with others—identify what just happen in nature—the capability to create new possibilities and molecules with new qualities to attend the new challenges of our society.

Atom composition and structure is like a planetary system. It has a central nucleus with a specific composition including neutrons (particles without electromagnetic charge) and protons (particles with positive electromagnetic charge); these particles represent the mass of the entire atom as they are 1800 times bigger than outside elements. The atom has surrounding orbiting units: electrons (particles with negative electromagnetic charges moving permanently around the nucleus; this orbit design ultimately gives the delimited characteristics to each atom).

The incredible little size of this element impacts the fact that only by instruments is possible to imagine the spectrum as a planetary system with so incredible internal distances and speed really out of any normal experience. By this consideration everything in the real world is almost empty space with energetic atoms' attraction and repulsion phenomena present and in permanent motion.

The progression of elements (ATOMS) in that official list is in order of the number of protons inside the nucleus and the singular quality and identification of each one is defined by the orbit structure of the orbit of external electrons. All this structured orbit defines the physical and chemical characteristic of each one.

The energy areas around the nucleus, known as electron orbits, are clearly defined giving permanent attraction and cohesion to the entire entity. It is known that each orbit is identified because of the energy needed to remove any electron located—increased energy as level orbit is located from the nucleus (FIG. 10).

As we understand all this orbit information is considered spherical, but in fact only one possible orbit is (FIG. 10). It is important notice that the real structure of these orbits have different and complicated currents (FIG. 11). Every orbit is currently moving a number of electrons but the 4 species is defined in different options making the sequence really diverse that any other with a special number capacity.

The options can be without limit as the mix of these elements can be structuring all known matter in the world—some can only be detected totally in labs—with some basic rules: The last level of orbitals has a limited capacity of 7 different species with 8 electrons involved. When an element's electron is added, removed or attached to another element to form a molecule (or the same between molecules), it has to be located or aligned on external orbits where one or other space is available. It is not possible to add or align electrons in sub-level orbits.

The nature of electronegativity of each element (ATOM) is in the capacity of each one to attract or align with other atoms' electrons—the energy connection established between them is the key point of all chemical atoms' activity—and the singularity of each atom is marked by its own electrons line.

Some elements can make different structure aligned combinations (forming new molecules) only defined by different electron relations creating new energy potential, with new chemical characteristics and mark great influence between that can modify close elements permanently.

Electron activity is the energy useful to guide chemical reactions and define any atom's reactivity when it interacts with others.

Some elements and molecules can accept or donate external electrons creating energy bonds with different and opposite energy on both sides (FIGS. 8, 12, and 13—example with water basic elements and molecules options). In this process the energy bond supports the new molecule structure and creates new characteristics appearance, new chemical specifications with a permanent interaction. This interaction can be present involving quite different elements (gas-gas, solid-solid, liquid-liquid or between interchange NaCl, $CH_4$, $H_2O$, FIG. 14).

Example—Burning Paper with Gases and Ashes Remains

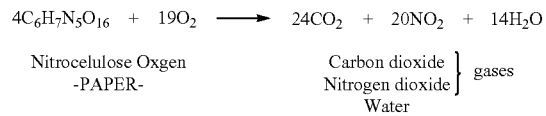

As a rule no atom is lost; only the phenomena of re-alignment process is in place. Electron interaction is only possible by their own structure and by the external phenomena present such as temperature, atmospheric pressure, humidity.

Attraction or repulsion phenomena occur because of its own structure when close with another or when they are attached to form new molecules—charges are proportional located on opposite areas of the molecule-bipolarity (FIG. 13).

All living organisms (animal and vegetable) can keep their live structure as long as their molecules have the capacity to interact with the outside electro-chemical activity of other molecules in any environment. Repulsion and attraction forces of charged particles (electrons) can modify other external molecules' structure and utility on proportional reality of each charge and distances (Newton).

Through hundreds of experiments scientific efforts got the capability to generate and use electrons in motion. Electricity (handling of electrons) became to be a basic support of our capability to face the changes of the environment. A number of new experiments were made to create electrostatic field for new utilities and new design of devices to control them (motor design).

The role and use of molecular polarity, the orientation and use of ionization units, the best handling of polar and bi-polar phenomena are the beginning of our modern perspective of life (FIGS. 15 and 16).

All these experimental activities give us the capacity to change molecular structure, modify molecular electromagnetic orientation, and handle a better use of the electromagnetic capability of the newly created molecules.

Specific engine designs give solutions and new development possibilities (electro-transmissions, communications, medicine and industry).

The exemplary textbooks and papers in the following complementary references detail the state of the prior art as outlined above.

COMPLEMENTARY REFERENCES

Plant development.—Marja CP. Timmermans.
Research in select Plant Physiology.—Clive Koelling.
Applied Tree Biology.—Andrew D. Hirons, Peter S. Thomas.
Esau's Plant Anatomy.—Ray F. Evert.
Plant Cell Biology.—Martin W. Steer, Brian S. Gunning.
Plant Hormones (Physiology, Biochemistry and Molecular Biology).—Peter J. Davis.
Plant Biotechnology and Development.—Peter M. Coresshoff
Soil Science Simplified.—Donald P. Frauzmeier. William W. McFee. John G. Graveel.
Soil Fertility and Fertilizer.—John L. Haylin—Samuel L. Tisdale Werner L. Nelson—James D. Beaton
Mineral Nutrition of higher Plants.—Petra Marschner.
Western Fertilizer Handbook.
The art of balancing Soil Nutrients.—William Mckibben.
Principles of Soil and Plant water Relations.—M. B. Kirkham.
Physico-chemical and environmental Plant Physiology.—P. S. Novel.
Regulation of Plant aquaporin activity.—F. Chaumont. Moshelion & Daniels M. J.
Interaction between Electromagnetic Radiation and cuticle.—J. D. Barnes, Cardoso-Vilhena J.
Electromagnetic Waves.—Umran & Aziz S. INAN.
Field and Wave electromagnetics.—David K. Cheng.
Quantum theory of Fields II.—Weinberg.
Deep Electromagnetic exploration.—K. K. Roy, S. K. Verma—K. Mallick.
Gravitational Waves.—Robert ML Baker
Introductory Quantum Physics and Relativity.—Jacob Dunningham Vlatko Uedral.

SUMMARY OF THE INVENTION

The analysis of the land-water-root relation is the most important problem consideration to appraise the agriculture meaning in modern society and the most critical challenge. As mentioned before each chapter of these data has an indicative field of details and problems in their interactions to be properly evaluated.

Basic analysis on physics, chemistry and electric areas is the point of the purpose of this utility invention: the better use of the already known data and technology for best approach to the elements involved in agriculture (food production).

1. Land-Soil Composition

Known basic components in soil such as minerals, organic and inorganic molecules, sub-products of the present bacteria, viruses, fungus, and fauna, represent a complicated mix of nutrients stored for plant survival and represent the production capability. Plant genetic evolution to address this purpose in any specific environmental conditions represents the nutrition-productivity challenge.

Permanent studies and experimental activities let us know what specific nutrients are needed for each plant species and performance. With this information better land preparation can be designed or better nutrients to be added (fertilizer) or whatever kind of conditioner is needed.

All the present basic minerals, the organic or inorganic molecules or fauna derivatives have a bi-polar electromagnetic charge that we can identify to find the best for the plant nutrients absorption. This ultimate purpose and operativity depends on the electro-chemical disposal that can match with the nutrient selection and transport. The soil molecules' bipolar characteristics define the electro-chemical utility for each crop.

A main objective of this utility invention is to handle in a selective mode all the options of the soil nutrient selectivity.

2. Weather Conditions

The photosynthesis phenomenon is always attached to the daylight and weather conditions independently of the soil's capability to provide adequate conditions for any plant performance.

Dry or wet atmospheric conditions permanently define the condition for the absorption-evaporation rate as the vital condition for the entire plant activity. They represent the principal part of the nutrients' possibility to be absorbed and transported. Night activity is almost reduced because the leaves' gas evaporation and absorption is different as the total bio-chemical activity.

It doesn't matter how complete the nutrients and water-solutions are in place if the evaporation process is stopped, this is an external factor to analyze as a challenge for better and secure results.

3. Water

A close analysis of this element is important as a structure because of its own characteristics and utility.

As mentioned before any natural source of water represents a uniformed molecule structure (FIG. 7) as long as different atoms can be involved: Hydrogen, Oxygen units, some molecules as $H_2O$, $O_2$, $H_3O$ (Hydronic ion) $H_2$, $HO^+$ (Hydronic ion), $H_2O_2$, $H_3O_2$ and some other molecules.

All of them have their own electro-chemical spectrum and a bi-polar orientation—they are in permanent motion and by these characteristics may interact with other molecules to form new compounds—(water is referenced as the best dissolvent). The electro-chemical structure of water may blend with the minerals and molecules present in the soil and represents the best available way to form solutions able to be absorbed, transported by the plant to perform the nutrition process.

The best application for these phenomena between soil-water activity is by this utility invention because electro-negativity charge can be induced, oriented, and controlled to manipulate the characteristics of the entire process: selection of nutrients, absorption and transport. (FIGS. 15 and 16). By this process the engine design (A) can give impulsive or repulsive electron current into the water solution molecules. The second (B) engine design creates a magnetic field on its own structure but establishes an empty vacuum energy passage that aligns the fluid molecule content. The orientation of this impulse can be changed at will. The third (C) engine design creates an internal magnetic field to manipulate the final charge of the water molecules to prevent the final interaction with the soil nutrients—power and orientation can be modified at will.

Only Distilled Water (FIG. 13) can be with balanced electro-chemical molecules—this condition is not known in nature.

BRIEF DESCRIPTION OF THE DRAWINGS

FIG. 10 illustrates atomic electron orbitals;

FIGS. 16, 16A, 16B, and 16C illustrate the use of molecular polarity to modify molecular electromagnetic orientation;

FIG. 23 illustrates basic elements acting as nutrients;

FIG. 24 illustrates additional basic elements acting as nutrients;

FIG. 30 illustrates waves and lines of electron activity;

FIGS. 33A and 33B illustrate the manipulation of electric and magnetic wave paths with induction engines.

DETAILED DESCRIPTION

Every plant species known is a result of thousands of evolution-adaptation processes that gives its own characteristics and a specific challenge for our society.

Figure 11:
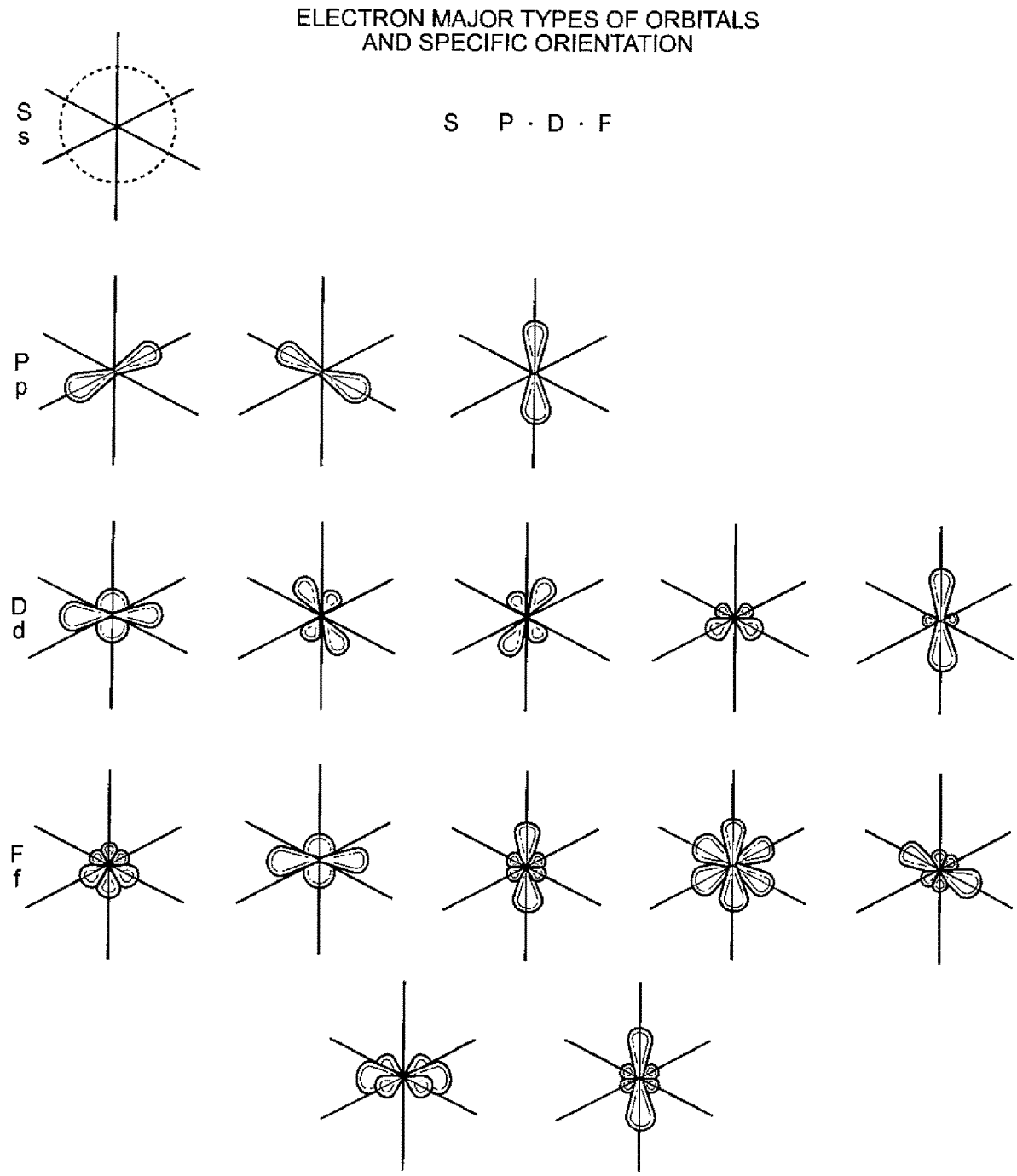
FIG. 11 illustrates major types of orbitals and specific orientation.

The electrons activity as well as the molecule structure are not correctly appraised because there is not clear information available—only general knowledge is reduced in a concept of circular orbits around a solid nucleus with different theoretical electro-magnetic charges and capabilities—but in fact all this element is a complex phenomena itself (FIG. 11).

It is important to analyze some of that element composition and the strange capacity to bond with other with electromagnetic interactions that represent the world as we know it. The great variety of known substances is the final of many ways that atoms can be combined. Elements that integrate an atom unit (neutron-proton-electron) are the same structure in the world, the only difference is the location-orbit of each one—all possible combinations structure the reality we know.

The electromagnetic equilibrium of each element is a direct reference of the amount of internal unit in the nucleus and the amount of external orbital electrons. Even so, the most external orbit has a defined capacity and the atom can be internally equilibrated but has external units in default that will create an interaction that makes attraction or repulsion phenomena with others (FIG. 14), as we can find in complex molecules $H_2O$, $CH_4$, NaCl. That represents all the matter in the universe.

Every atom is in permanent motion even as molecules (until a temperature level of zero Kelvins), and that characteristic makes permanent motion and interaction present in organic—inorganic environment.

What we can produce with this utility invention is to give an extra capability to the water molecules to interact with the soil molecules for manipulated selection and controlled absorption and transport inside the plant structure.

Modern technology to plan and design any kind of engines for energy specific activity is leading the modern industrial developments: electro-magnet use for industry performance, transport options, communications and equipment, and electricity production (electron current) conduction control and final distribution.

The present analysis for better use of different engine designs for agriculture control purposes (FIG. 15-16).

Figure 15A:
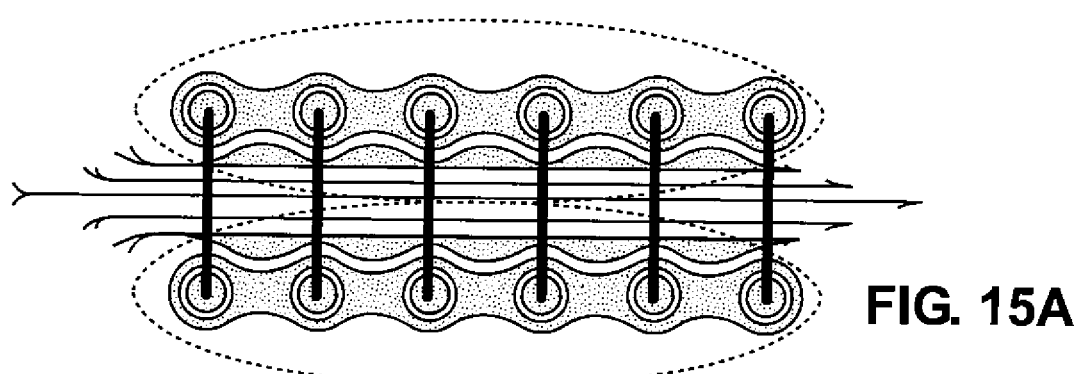
FIG. 15A illustrates an induction engine creating an electron current.

FIG. 15A—Solenoid (Transformer)

The solenoid design is a rolled wire in a solid structure that when an electric current (electrons current) is connected that current is multiplied increasing in a defined direction all the electron current—(in a car a 24-12 V battery can be through the coil-solenoid-transformer—increase until 20,000 V needed for the spark combustion process).

Then, an increased amount can be oriented. In the present utility invention the first step can be to use this engine structure (as electro-magnet is used to hold heavy material). This design has an empty nucleus where the electrons can be oriented giving or reducing electrons current into the water flow transforming the current capacity for energetic interaction. This design can be oriented to the opposite direction modifying the electromagnetic capability of the water in use. The energy level can be controlled at will.

FIG. 15B—Toroid

This design consists in the wire enrolled on a circular structure (as a circle) creating a circular electron current exactly in the enrolled area and a vacuum area in the center of the circle. This vacuum area represents a new phenomenon that can create order or orientation of the molecules (FIG. 15-16).

As this happens the water molecules activity in the soil elements can be oriented as needed.

The final design of this invention allows the modification of the molecule orientation and strength of the water structure and interaction when colliding with the soil molecules. This engine activity is designed to give controlled electroactivity to the water molecule structure defined on the plant genetic code performance.

Figure 15B:
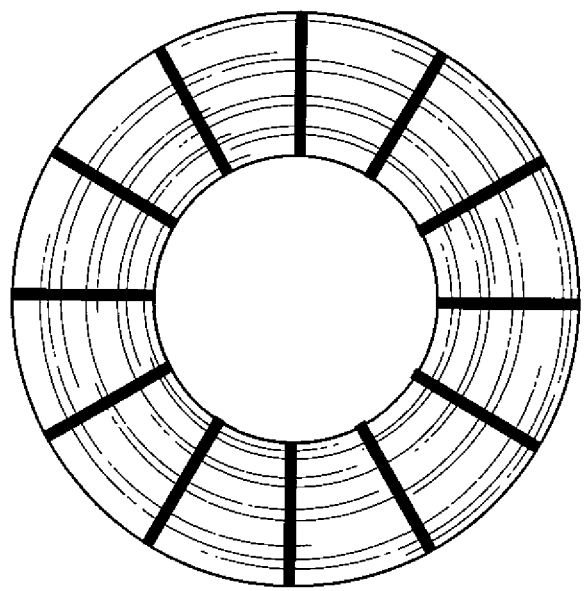
FIG. 15B illustrates a toroid engine creating a circular electron current.
Figure 15C:
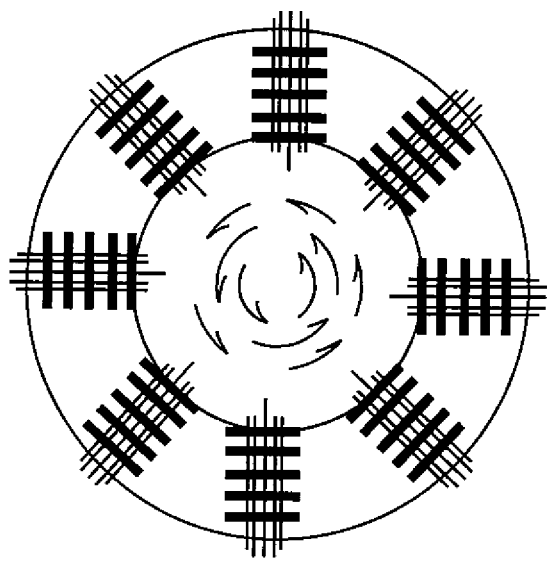
FIG. 15C illustrates multiple induction engines resulting in circular internal electron flow.
Figure 17:
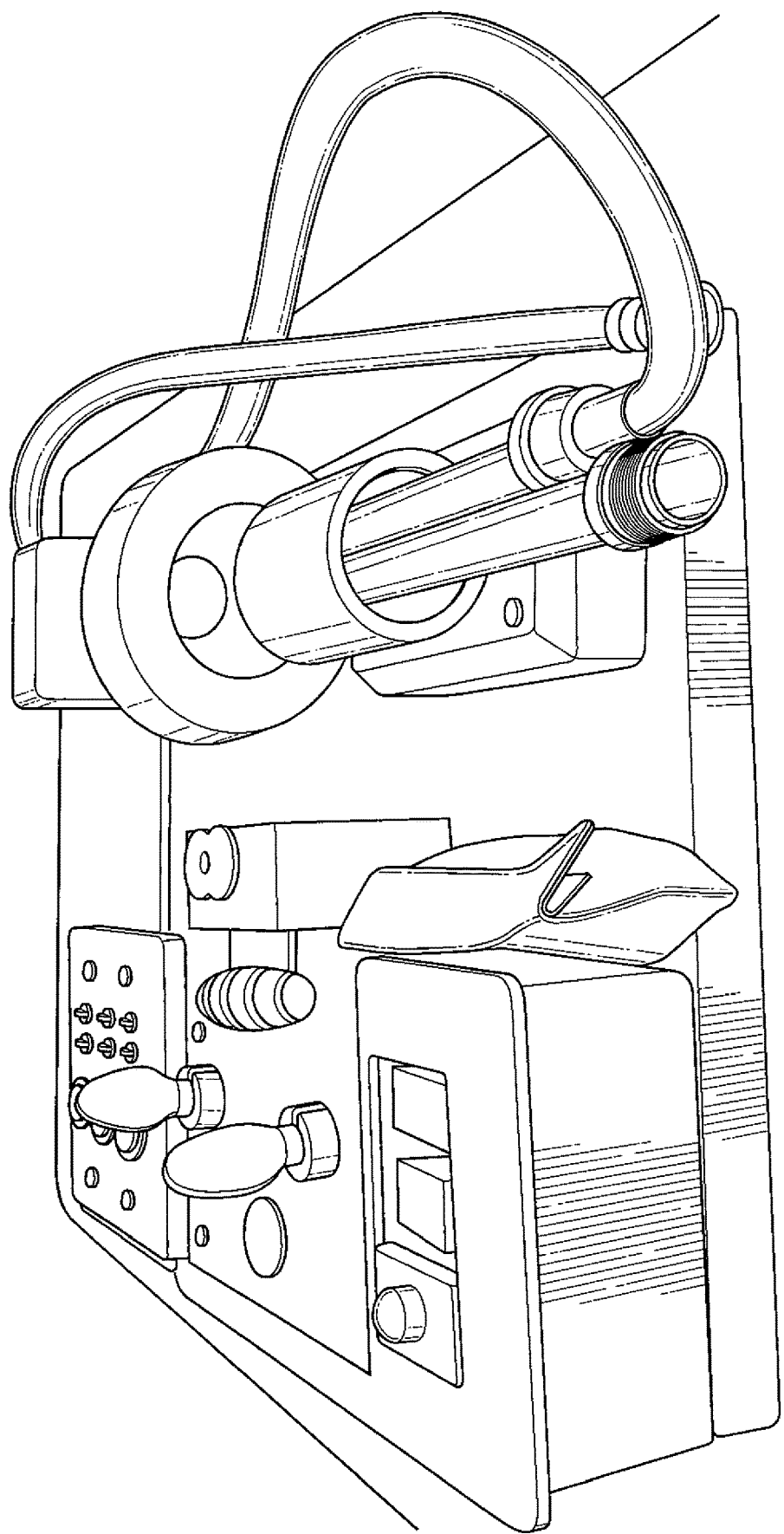
FIG. 17 illustrates an exemplary embodiment of an engine of the present invention.

FIG. 15C—Electric Basic Design.

Separate units acting as electromagnets designed as alternative charges in motion creating circular current of electromagnetic charges (electrons) in a designed direction (FIG. 15-16).

All the electrons will be oriented in an induced circular current giving an energic active capacity to the water molecules that can interact in the molecule mix of the soil structure. This engine design can modify the final orientation or power to change or modify the water activity.

These A-B-C engines combined can be used in both directions separately to have a number of options in hand.

The main purpose of this utility invention is to provide a controlled energy device to increase or reduce capacity of the water molecules interaction at an electro-chemical level with soil elements for a guided absorption-transport activity. It is a better option for manipulating all the molecules involved to facilitate the cell-root system in this first step of plant performance.

The academic focus of the invention is not just related to the mechanical phenomenon of water molecule orientation for better nutrient absorption by plant roots; it is a complicated structure that needs specific order on a number of elements that do not always occur in nature and that need to be implemented for plant survival and production.

Water is a complex molecule with physical, chemical and electromagnetic characteristics, has been under research for the last century for many individuals and institutions and now we have a large data for better conservation and use.

To understand the total plant nutrition phenomena some other issues need to be studied:

a) Nature of soil composition—there are some nations that have large amounts of rain and rivers but do not have good agriculture results.

b) Nutrients from biotic decomposition are not always in disposition.

c) Previous agriculture activity changes the bio-chemical soil conditions restricting new crop capability.

d) pH values from previous crops and fertilizers used because residuals cannot be removed—some human hand is needed by physical and chemical activities to find a balance (electro-magnetic process).

e) climate and temperature figures.

All plant biology can be defined as a chemical chain of events with electromagnetic characteristics at each step of the evolution: seeds wake-up to start the process; first growing steps until maturity; flowering and development (complex chemical reactions); skin, root and leaves maturity; genetic reproduction process; aged and final stage.

All plants have the same conditions and characteristics as all living creatures (bacteria, virus, fungus and large animals); the main difference is that plants cannot move and spend their lifetime in the same place—but this gives to the plant the capacity to adapt its own DNA code to analyze, select, find nutrients, modify and use them.

Figure 1:
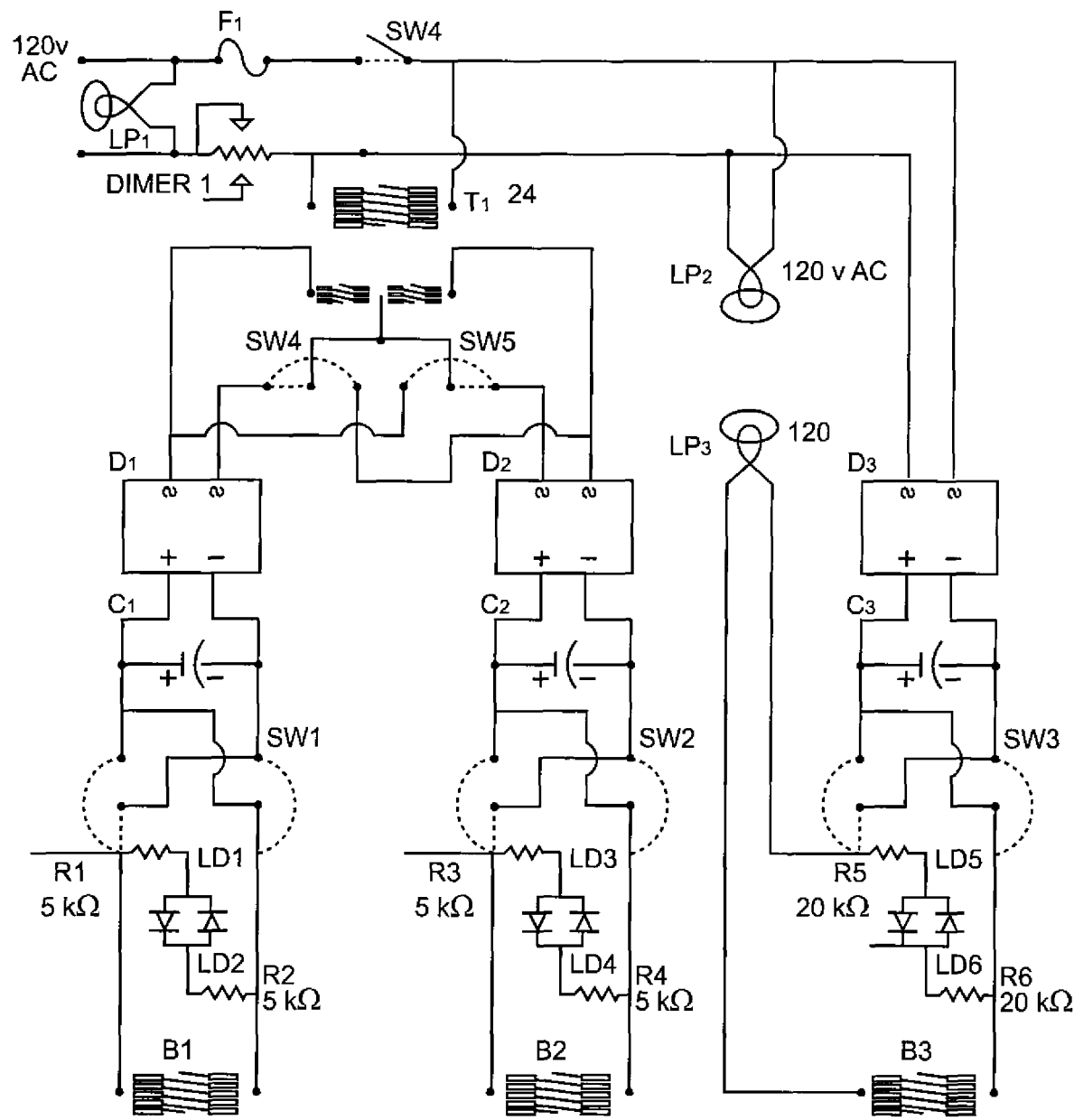
FIG. 1 is a schematic of exemplary circuitry for a preferred embodiment of an engine of the present invention.
Figure 2:
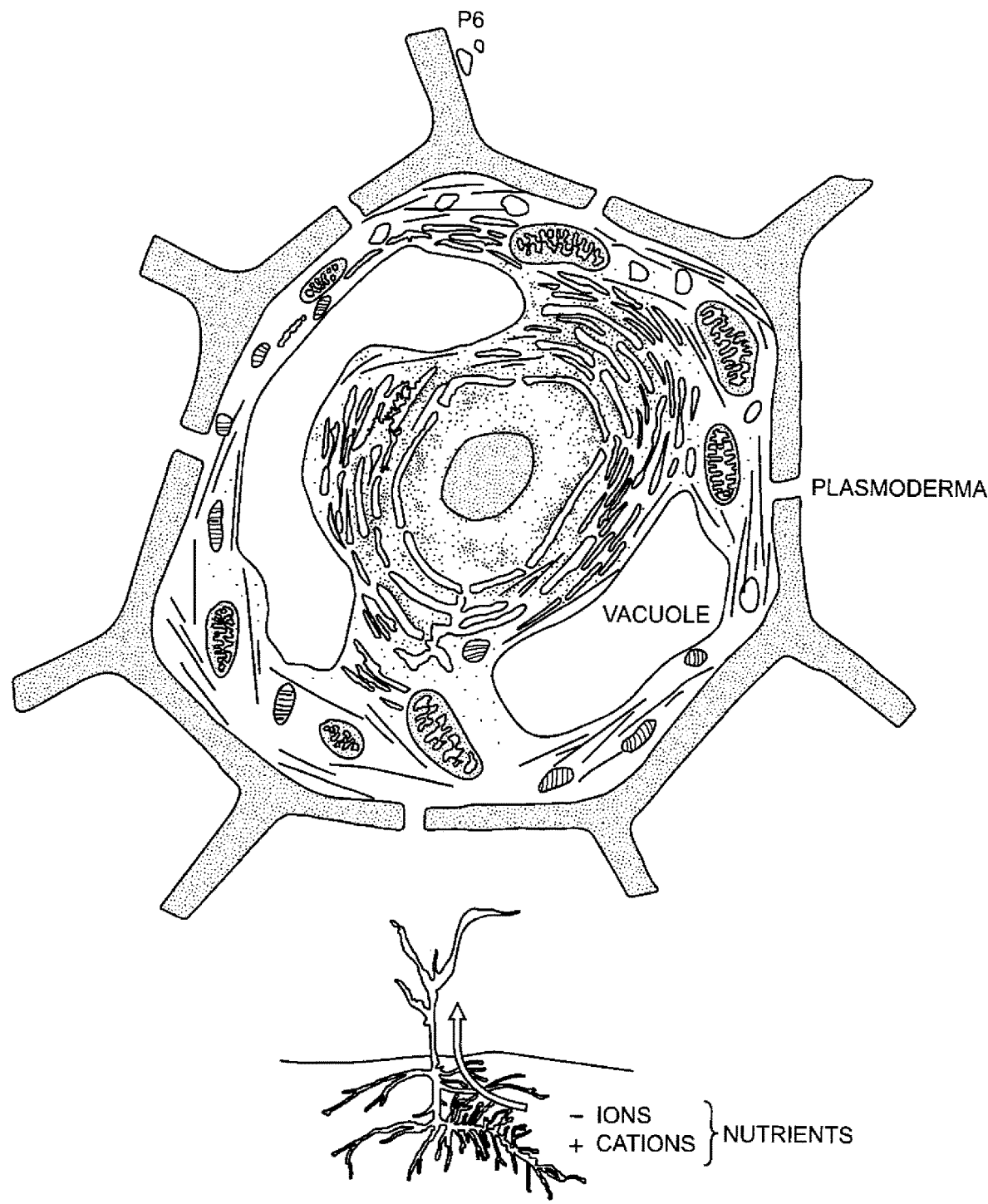
FIG. 2 illustrates plant cell structure and plant nutrient uptake.

The following additional analysis complements the above:

FIG. 2 is a plant cell display which can have separate organelles: a nucleus with DNA duplication capacity; an internal structure to take nutrients and use them as the environment requires (temperature and climate conditions); internal organelles to elaborate its own hormones, enzymes, sugars, proteins, vitamins; and its own water-oxygen reservoir as needed.

Figure 3A:
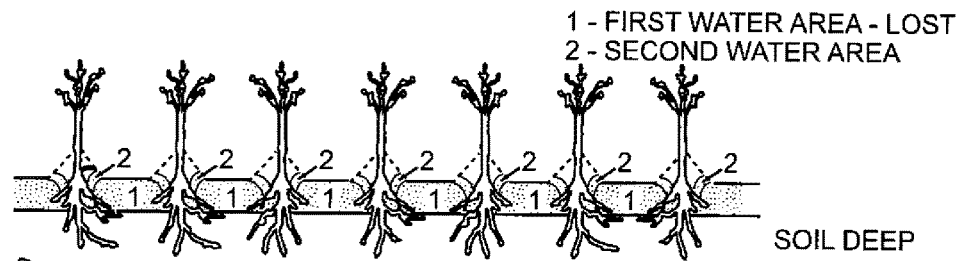
FIGS. 3A, 3B, and 3C illustrate the root system as basic support for uptake of nutrients and water.
Figure 3B:
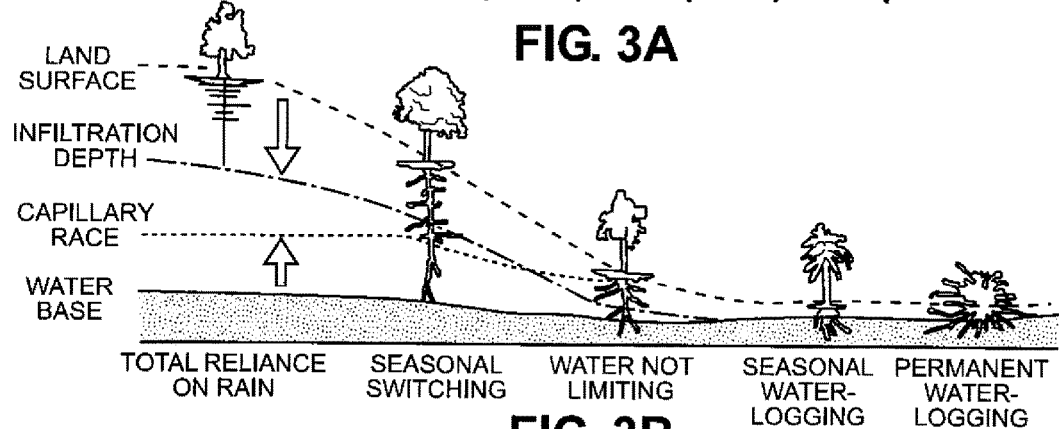
Figure 3C:
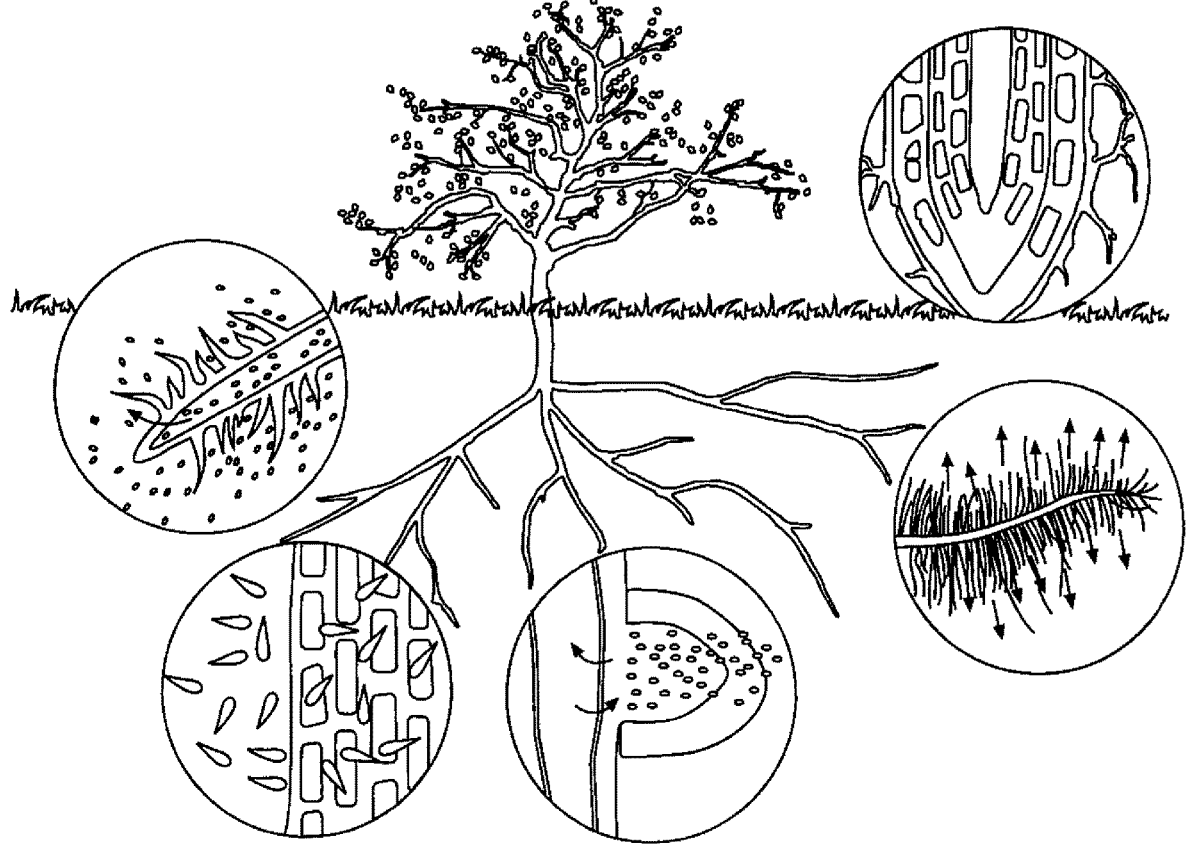

FIG. 3 shows three different aspects of the plant nutrients access:

A.—The usual irrigation process is not the best because the soil porosity capability and the plant root natural development. Normally half of the water used is lost.

B.—Different development of the root system relies on the land characteristics. It depends on the water bed location and each plant species can adapt and re-located his own development. Sometimes the root system development is larger than the total external size.

C.—General analysis of the root development and function, including detailed cellular development; extension of the root final system to exudation molecules control and mix with the soil conditions; presence of soil bacteria able to catch atmospheric nitrogen for ammonia structure and sugars; soil bacteria to interact with the local molecules, exudation plant residuals to adapt the necessary elements for sequence adsorption, and root constitution to analyze and complete the physico-chemical reactions (electromagnetic activity).

At the present time almost all agriculture process is manipulated through fertilizers of different structure. The use of greenhouses represents this manipulation: no soil support is available and external support is provided; no soil biomass and bacteria is present for the nutrient modification; and atmospheric conditions are transformed for better manipulation (light, temperature, humidity).

With these and other modifications the natural process is modified with different final results. Knowing the basic elements of the process the entire phenomena and results can be modified.

Figure 4:
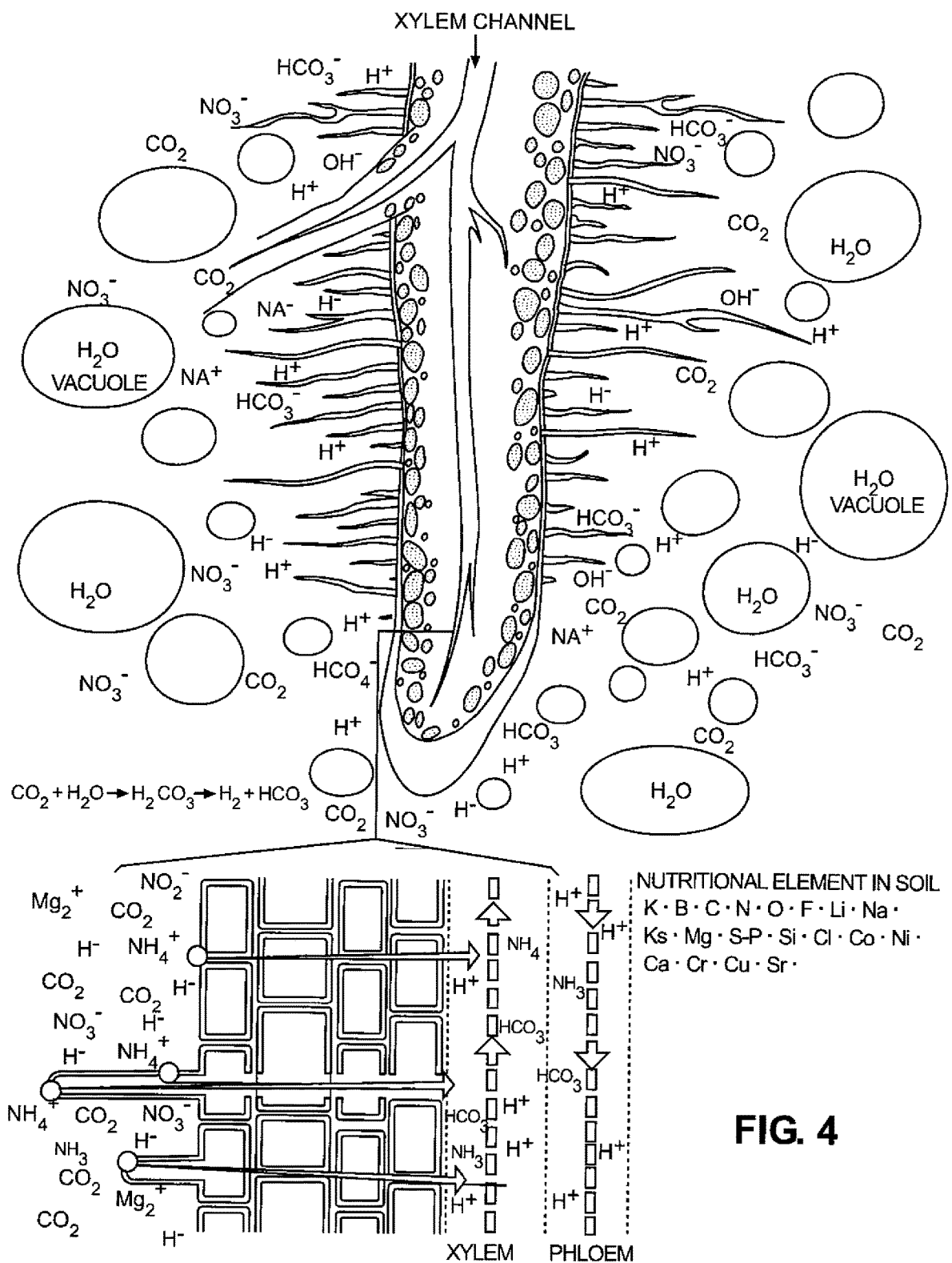
FIG. 4 illustrates absorption and distribution of water and nutrients.

FIG. 4 shows the basic nutrients absorption process. The upper area's purpose is to illustrate the soil condition where roots have to develop. The molecular composition shown a characteristic electronic and magnetic values: $H^{+-}$, $OH^-$, $Na^+$, $HCO_3^-$, $CO_2^{+-}$, $H_2O^{+-}$, $NO_3^-$, $P^+$, $NO_2^-$, $K^+$, $Mg^+$ and many more as local condition or previous crop residuals. Some of these residual molecules normally come from the artificial chemical fertilizers preparation that sometimes cannot be adsorbed or dissolved. Most of the chemical residuals remain as salts that cannot be dissolved and modify the soil structure and final pH condition.

On the lower area of the figure the cell root cellular structure is shown with the water solutes transport system present: xylem to recover the nutrients and move them to the leaves area, and phloem for general transport distribution of modified nutrients (sugars, enzymes, hormones etc.) for the total distribution of the modified molecules for the plant development (growing, flowering production, survival).

Figure 5:
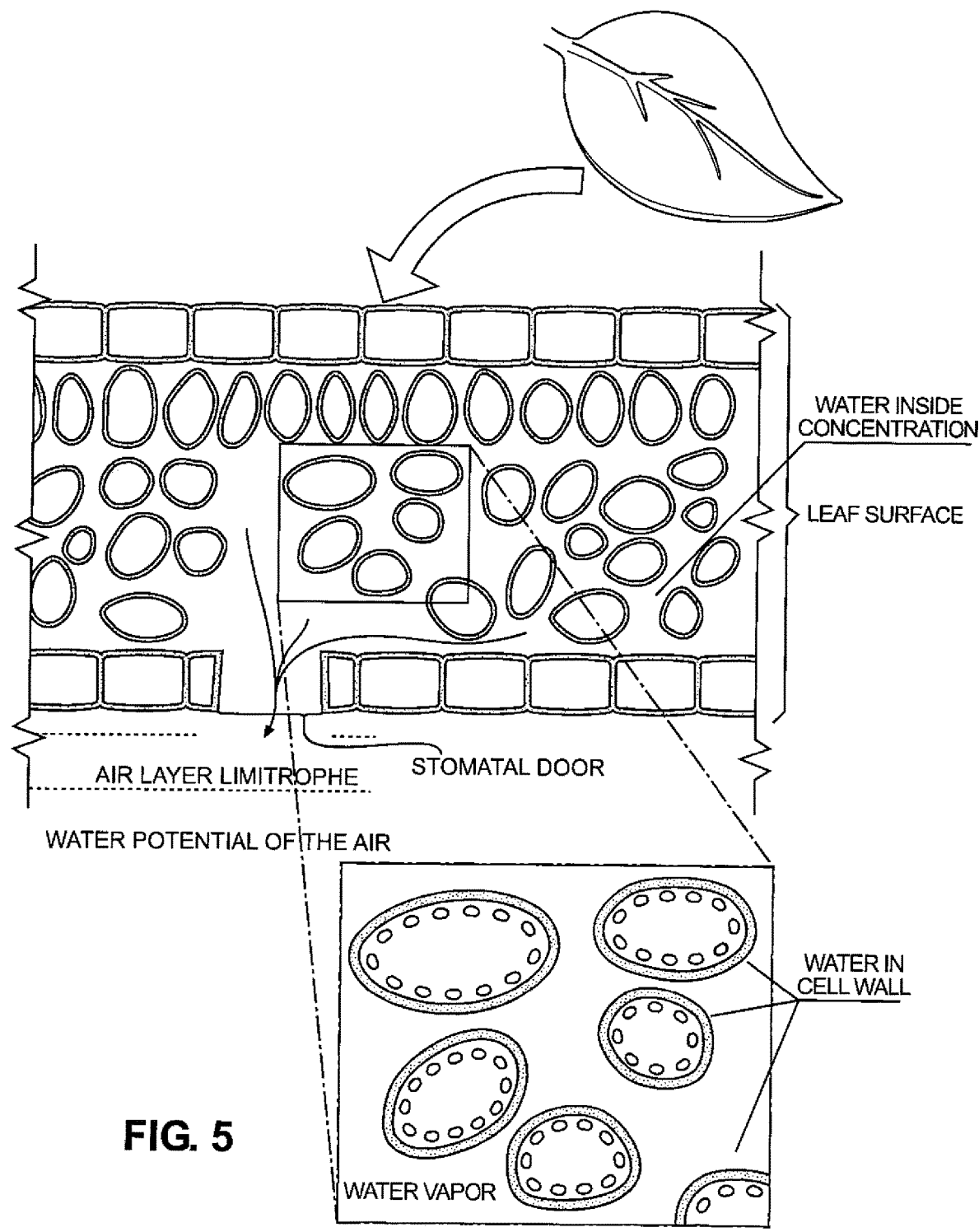
FIG. 5 illustrates leaf design.

As shown in FIG. 5 the entire nutrient absorption process is only possible by the leaves' chemical activity. Leaves' cell structure encloses a series of gas doors (stomata) when the water content of the nutrients flow is dissolved: Oxygen to the atmosphere and hydrogen recovered for internal processes with negative electromagnetic value.

By these stomata doors the plant creates a vacuum phenomenon moving up the water molecules from the soil area relying on the external atmospheric conditions of temperature, humidity, wind. This vacuum process catches the $CO_2$ (carbon-dioxide) from the external environment (all living creatures activity), separate the atoms from the molecule for specific function with the carbon and oxygen (metabolic activity).

Figure 18A:
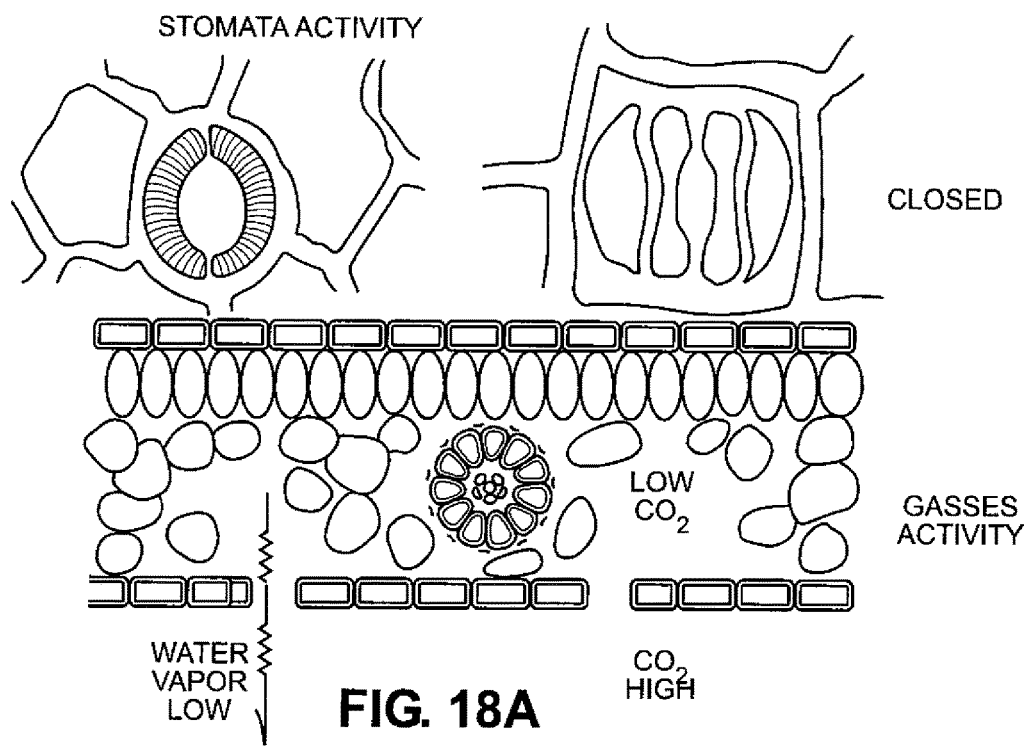
FIGS. 18A and 18B illustrate vacuum phenomena create by stomata doors.
Figure 18B:
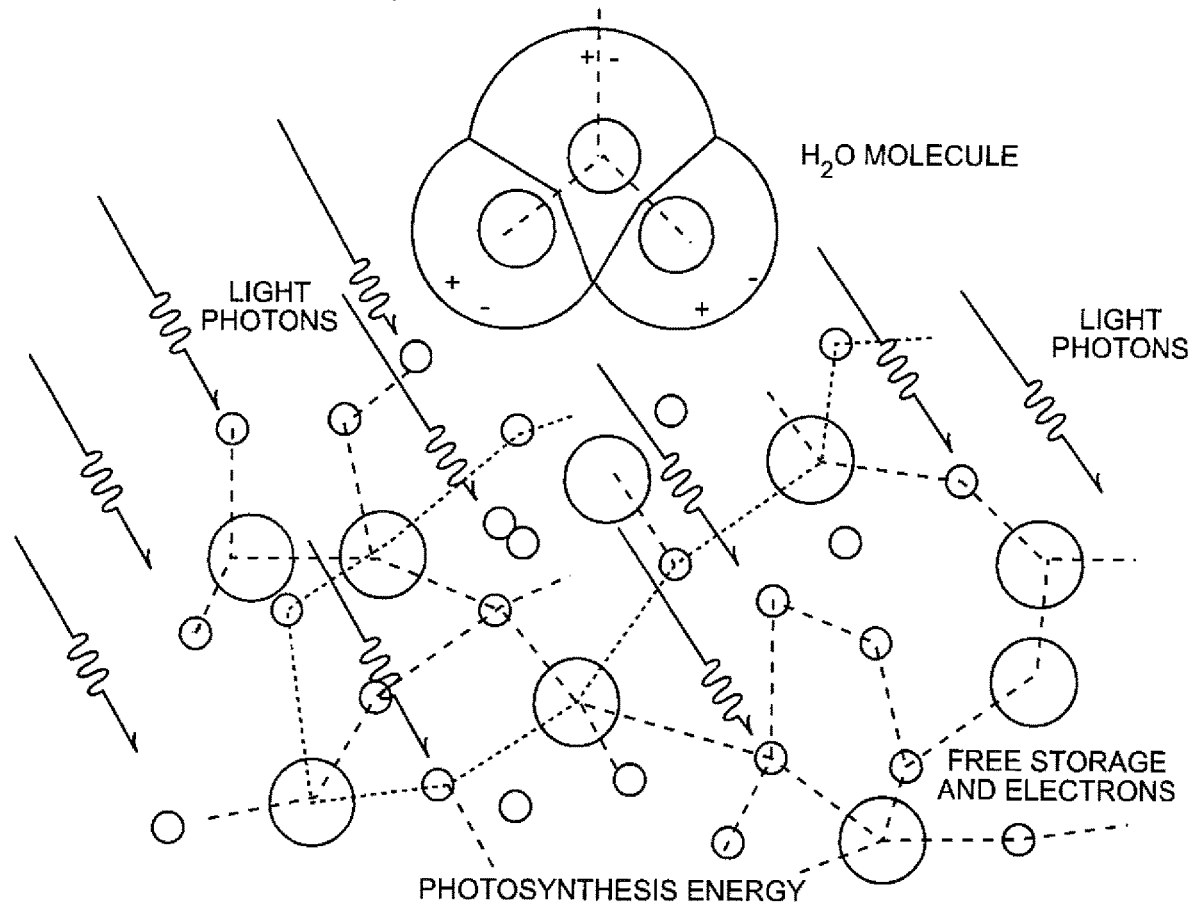

FIGS. 18A and 18B are added as graphical explanation.

Biologically the water-solute nutrients transport is in permanent activity from the soil environment to the atmospheric area through leaves system. Here the open-close phenomena (stomata activity) is in charge to recover and free the oxygen atom and hydrogen atom for internal use. To attract $CO_2$ from outside, it separates the molecule and uses carbon atom as raw material for sugars, proteins, enzymes and hormones—the residual hydrogen from the water molecule and the oxygen atom from that $CO_2$ separation—to create a strong electro-magnetic environment for the plant metabolism and the rest for the soil activity.

In the lower area the photon energy elements present provide energy and capacity as required.

Figure 6A:
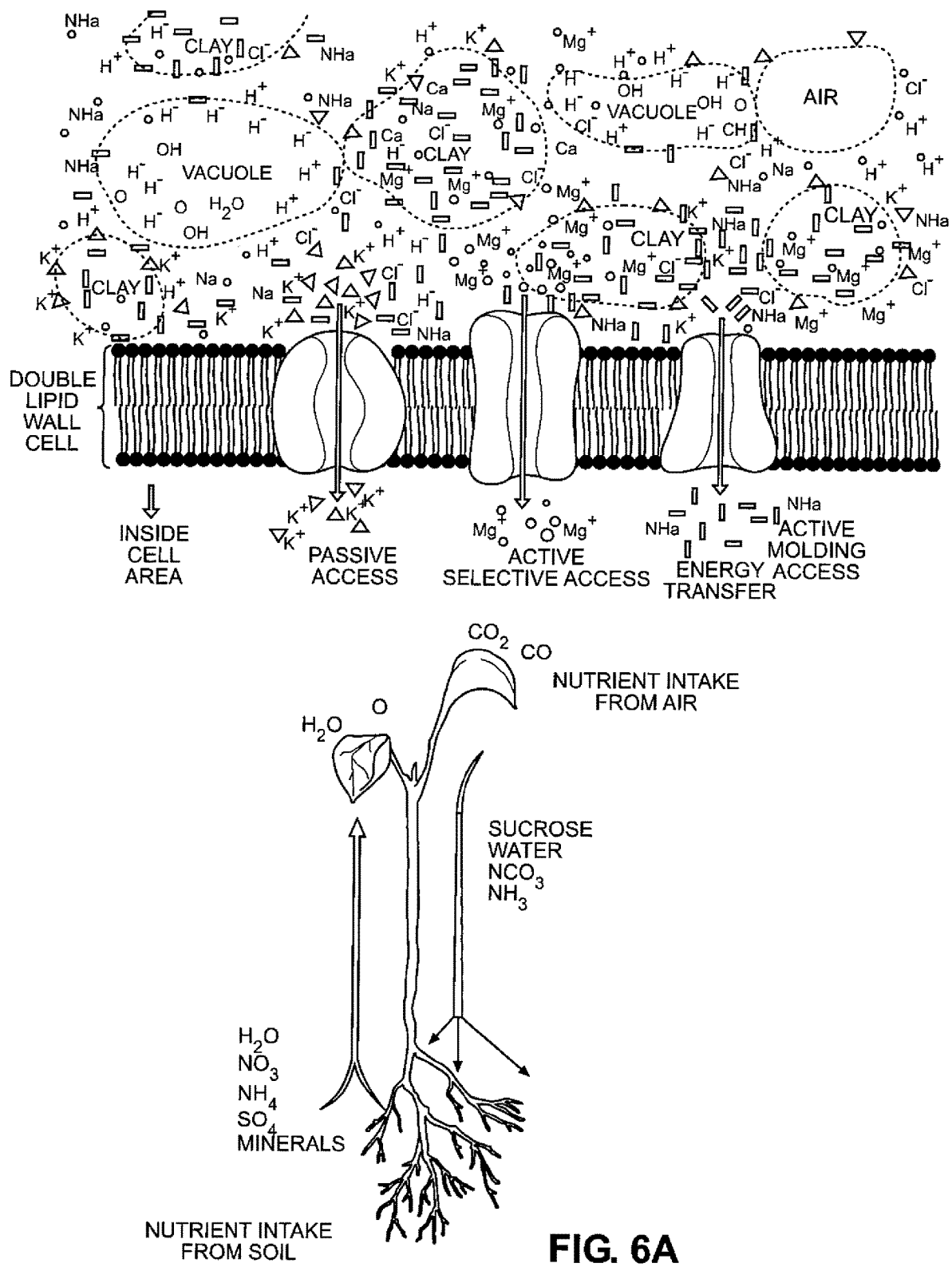
FIG. 6A illustrates selection and absorption work performed by the root cell structure.

FIG. 6A shows root cell activity. The upper area shows the external root cell wall in permanent contact with the soil elements composition as nutrients available. As the figure shows this root absorb capacity has a passive condition as natural access, and active selective access through electromagnetic adaptation. Energy transfer occurs where the root modifies the electromagnetic environment. The lower area shows the general intake of nutrient molecules and the return molecules to energy provided to the soil.

Figure 6B:
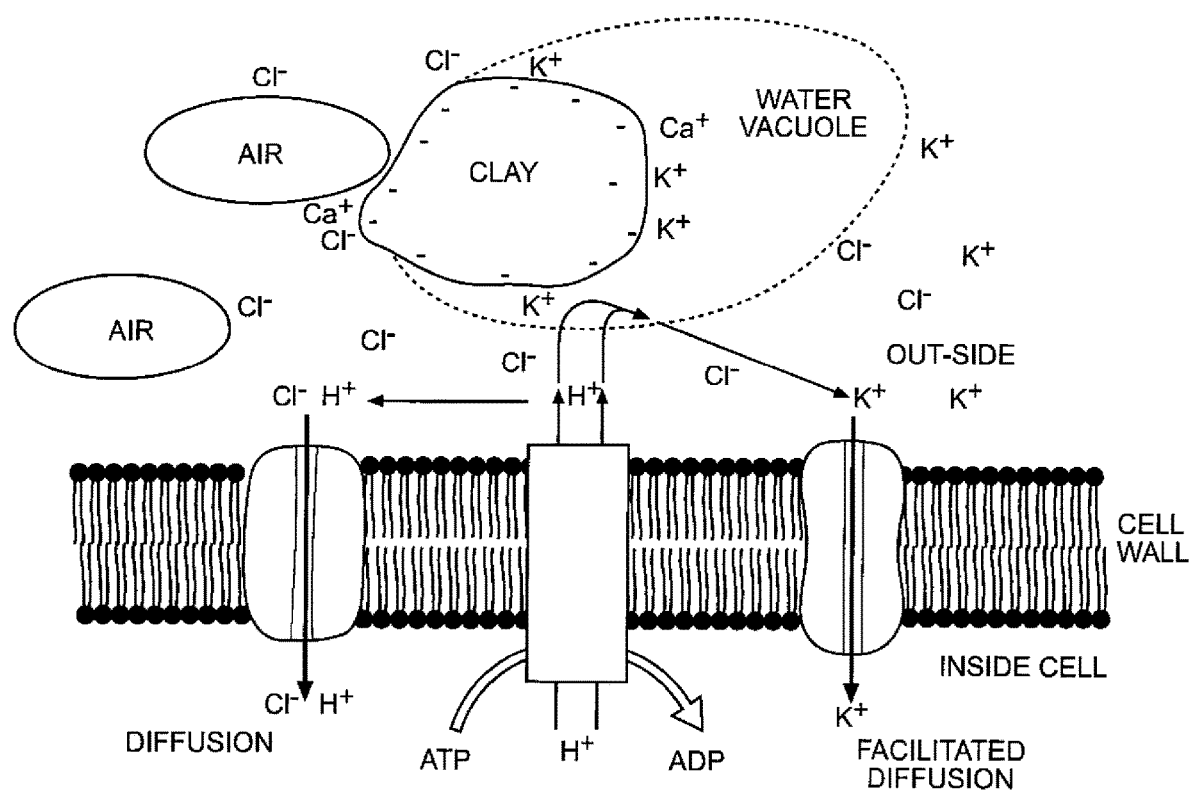
FIG. 6B illustrates activation and uptake of elements present in the clay soil surrounding the root cell system.

FIG. 6B illustrates root cell activity. More particularly it is a close detail of the soil-root cell relation.

Figure 7:
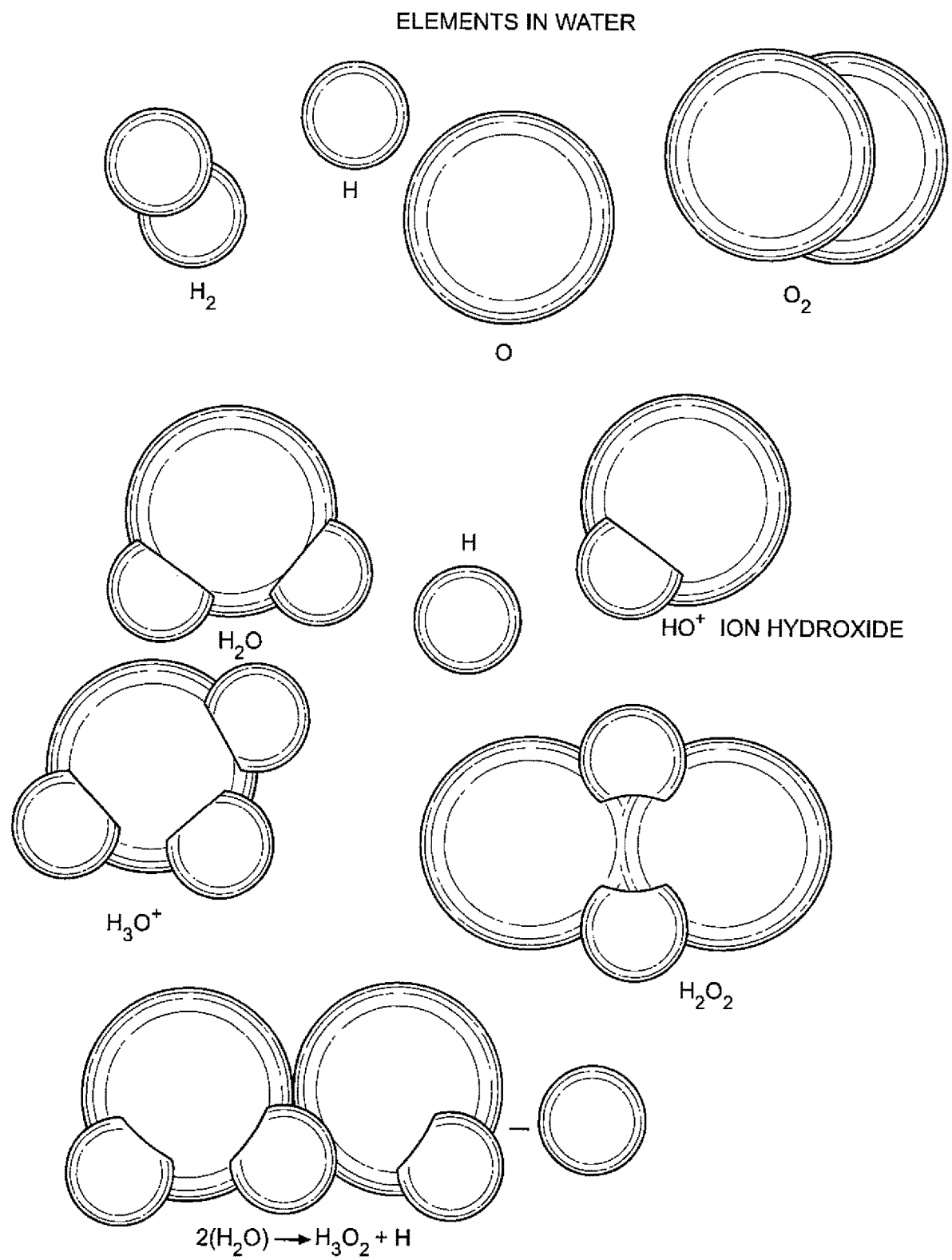
FIG. 7 illustrates elements in water.

FIG. 7 illustrates water's condition in nature. The $H_2O$ molecule in pure condition (distilled water) can only be found in laboratory conditions. In nature a number of molecules and atoms are free. The molecules and atoms illustrated include: $H_2O$, $HO$, $H_3O$, $H_2O_2$, $HO_2$, $H_3O_2$, $H$, $H_2$, $O$, $O_2$, etc., each of them with specific electromagnetic condition that permanently interact and modify each other's function. This entropy (activity) condition interacts with all the soil molecules and atoms as well as the bacteria capability. All this means that the Physical-chemical (electromagnetic) environment can be always be affected.

Figure 8:
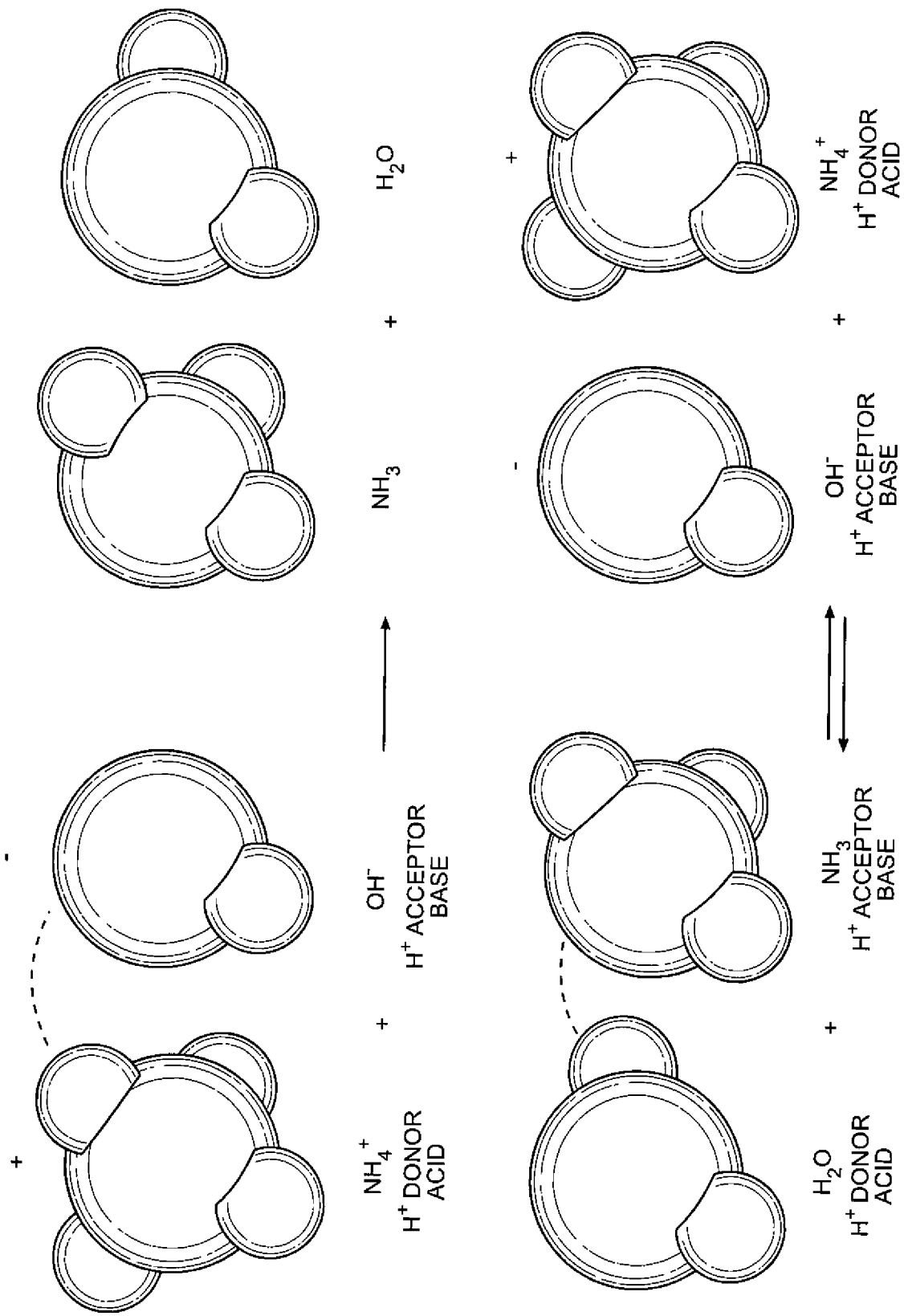
FIG. 8 illustrates changes in molecule's configuration when water is changing soil conditions.

FIG. 8 illustrates molecules activity. When the water molecule is moving the soil conditions, many changes can occur in the molecules' configuration. All these changes can be present with reverse modification capability.

Figure 9:
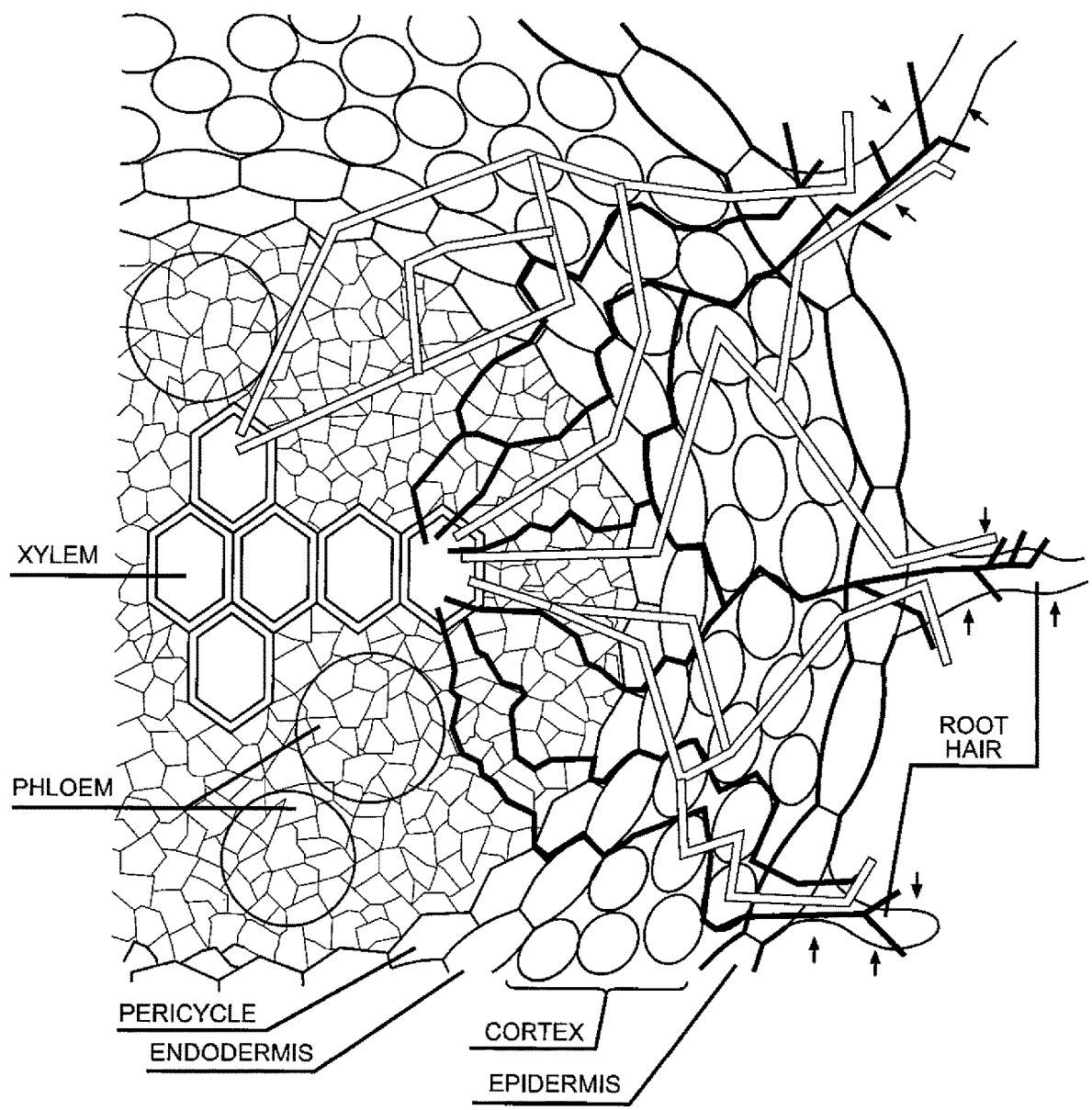
FIG. 9 illustrates coordinated activity of root cells.

FIG. 9 illustrates root cells coordinated activity. Different cell structure for the selection of nutrients exists, some can only transport these molecules from cell to cell (white lines with black outline) and others can only work from outside cell areas. All these conditions depend on the electromagnetic values.

Transport of the water molecules lines is performed by xylem and phloem. Xylem (central area of the roof—diamond shape) is the basic transport line to move the water nutrient molecules to the leaves area. Atmospheric conditions can modify the speed of this transport line. Phloem (central area—circle shape) after the nutrients get to the leaves area a number of molecules structure occur—all over the plant areas. This phloem transport system moves all these modified molecules until they can be deposited into the soil to start the process.

Essential conditions for plant development include soil, environment, and plant DNA attributes. Soil conditions include texture and porosity, bio-fauna integration, bio-residuals of previous treatment, contaminants such as salinity, fertilizers and fungicides used, chemical molecules' composition, and residual pH. Environment conditions include temperature in each step of the plant development (seed wake-up, growth, flowering reproduction, aging), humidity (aerial and ground), air composition, and water residuals. Plant DNA properties include adaptability for new DNA structure, biological identity with the environment, and each species' structure.

Figure 19:
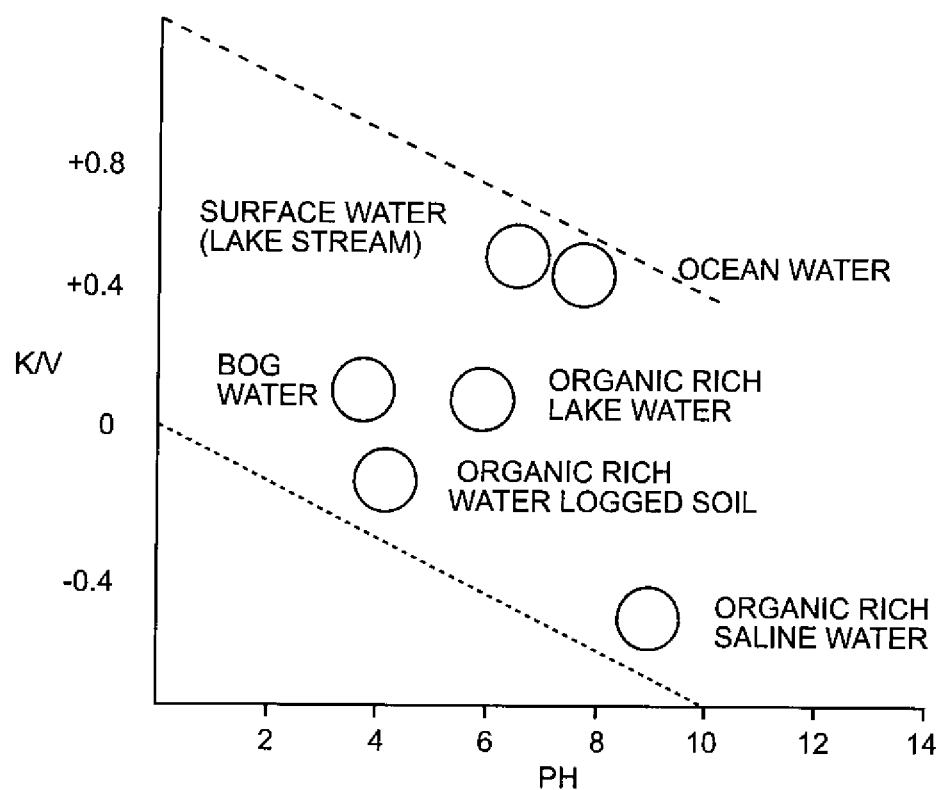
FIG. 19 illustrates water in nature.

FIG. 19 illustrates water in nature in a graph showing an example of the water pressure and the original source. Hydrogen residuals gives specific classification and as result the agriculture possibilities.

Figure 20:
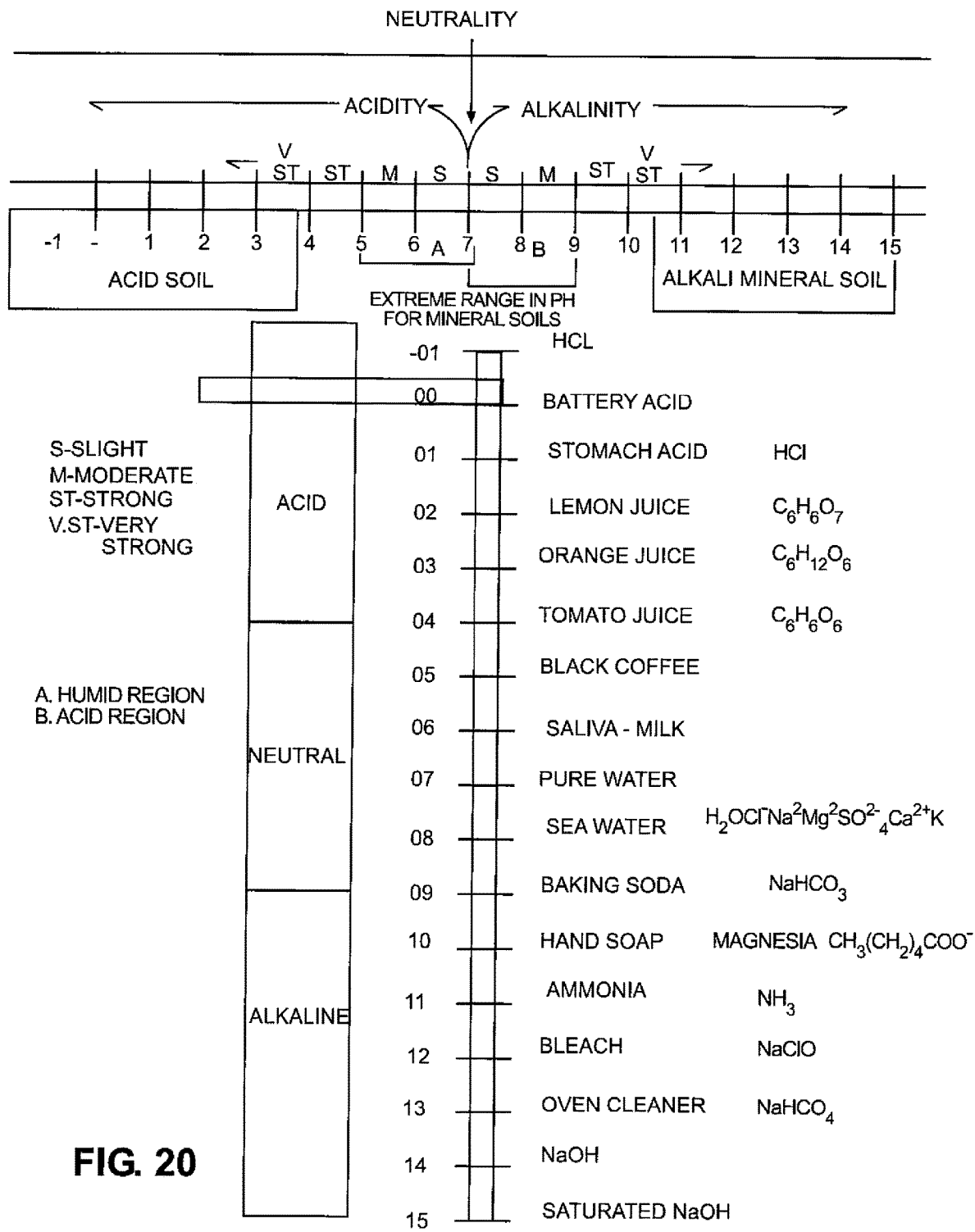
FIG. 20 illustrates soil pH effects on agricultural utility.

FIG. 20 illustrates pH on soil condition, particularly the range of agriculture utility of water pH condition. The DNA of some plant species has special conditions to modify their structure and adapt its development on 2.8-to-10.5 pH scale conditions. The electric and magnetic range capability of the water can change the final utility use.

Figure 21:
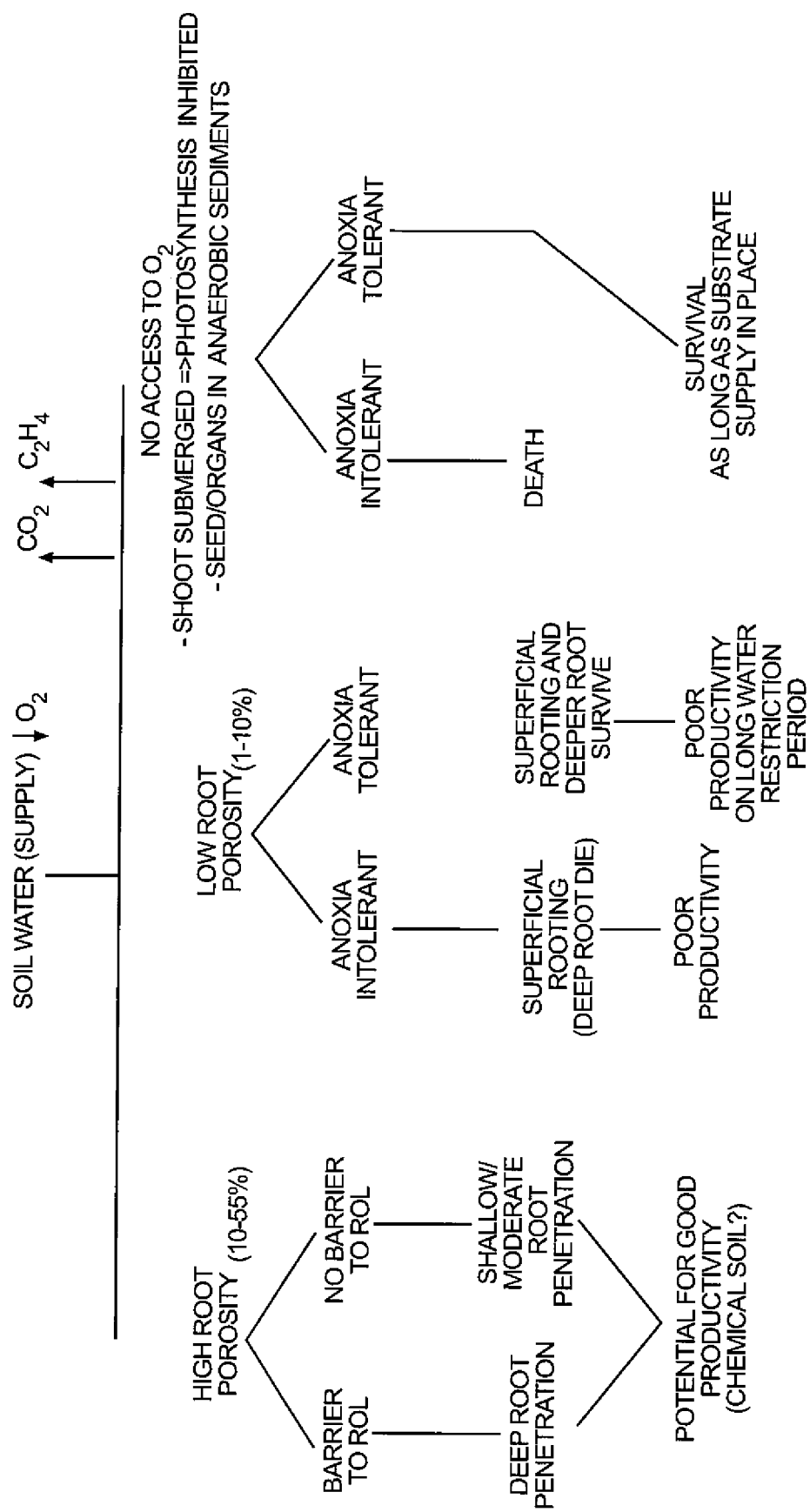
FIG. 21 illustrates water soil relation.

FIG. 21 illustrates the water-soil relation. In this scheme can be shown how the physical porosity of the soil can block the water supply and effectiveness. In these conditions the plant development can disappear.

Figure 22:
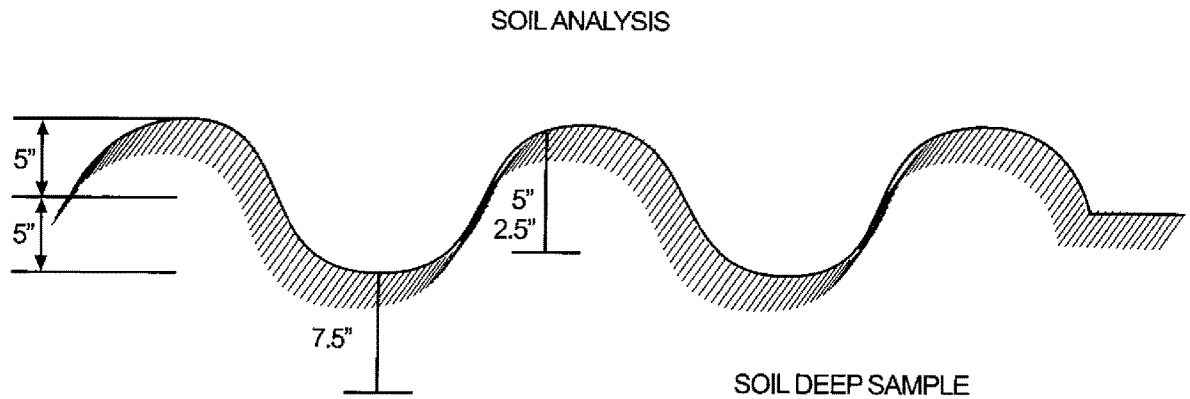
FIG. 22 illustrates soil analysis.

FIGS. 22, 23, and 24 show the basic irrigation process and the basic elements to act as nutrients. The two first sectors are related as electromagnetic values for the average saturation for an expected crop. Some of these molecules (FIGS. 23 and 24) have specific influence on the plant metabolism.

Figure 25:
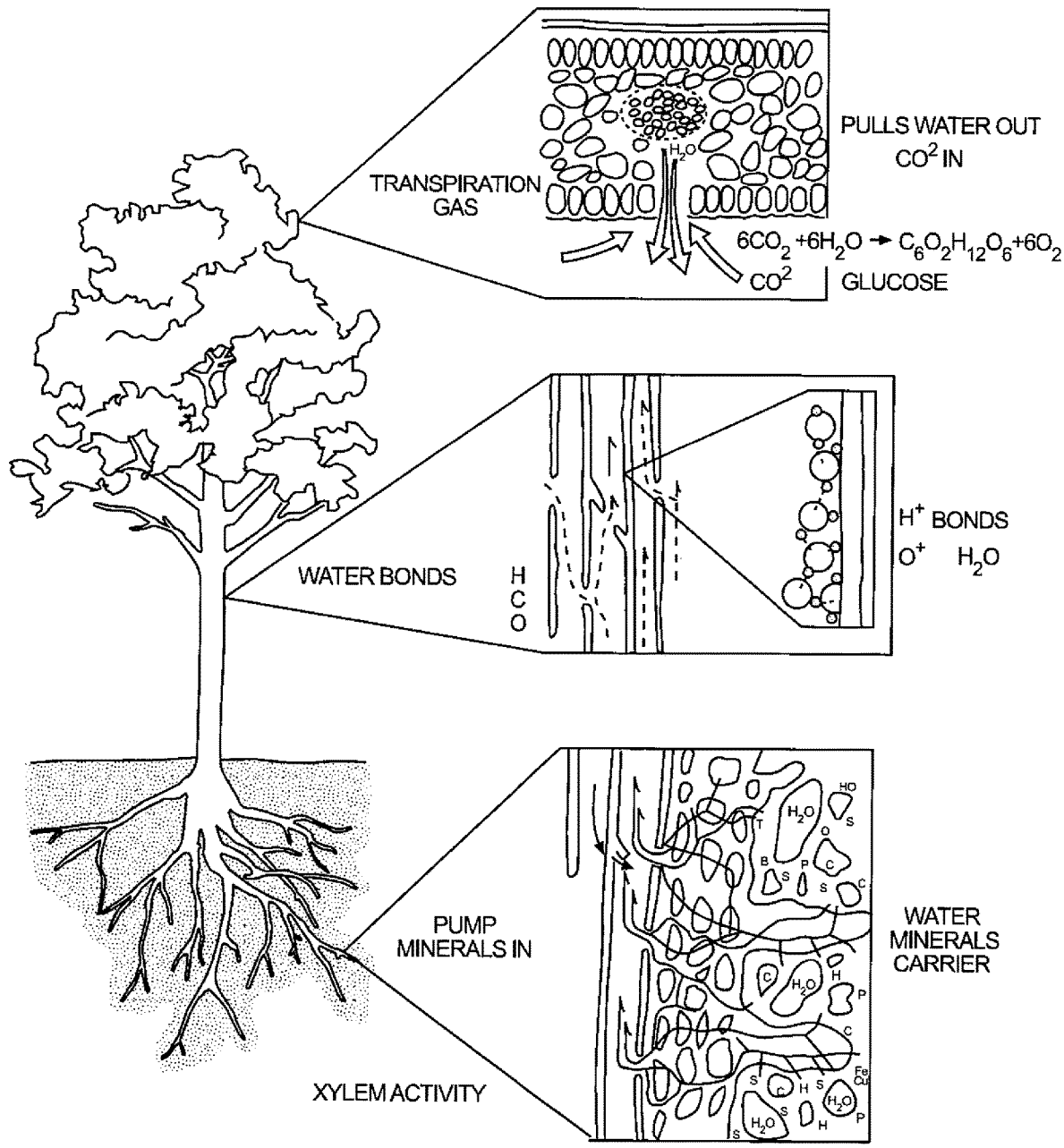
FIG. 25 illustrates the entire absorption route.
Figure 26:
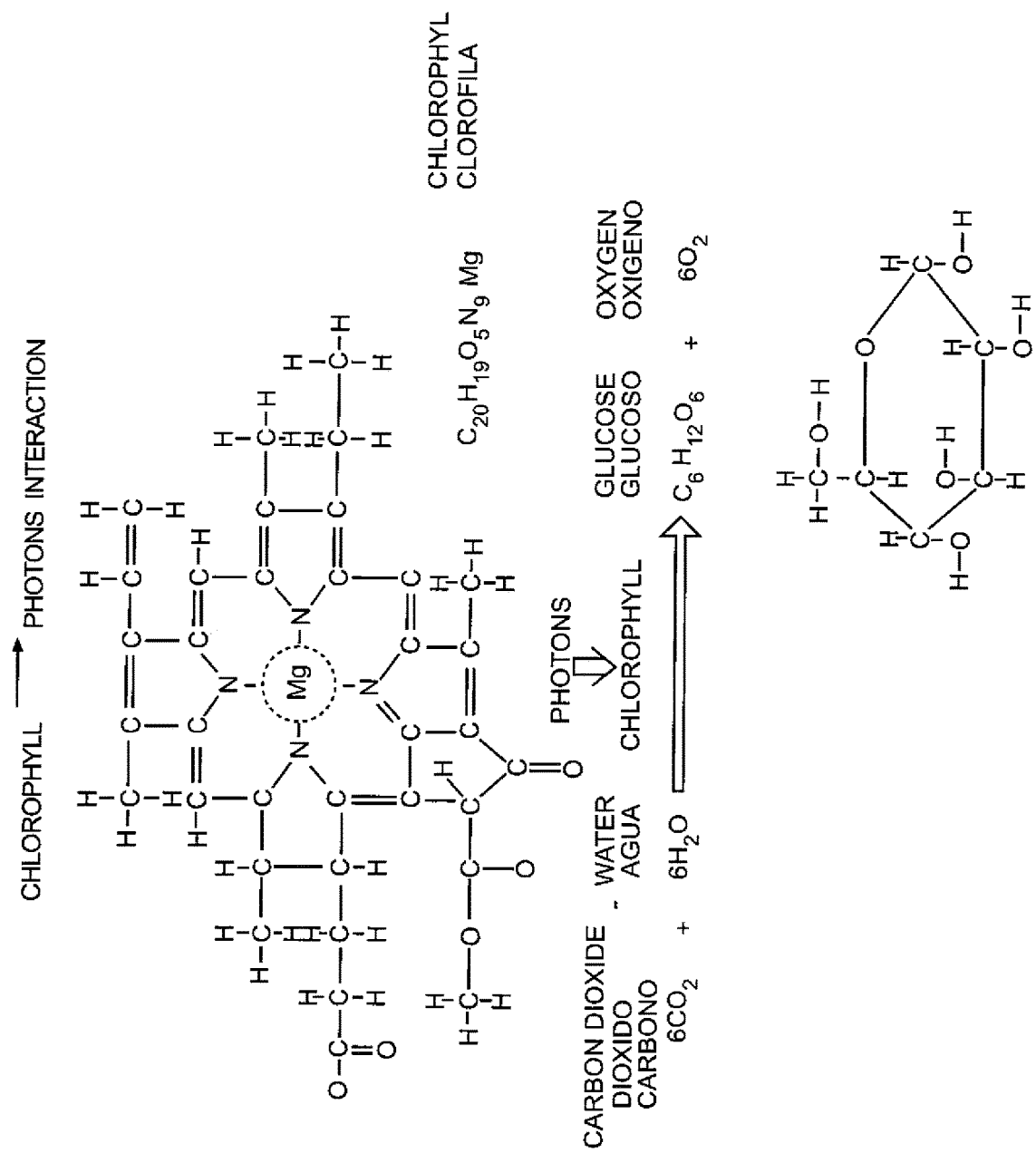
FIG. 26 illustrates the chlorophyll-photons interaction.

FIG. 25 illustrates the entire absorption route (xylem). As previously mentioned the absorption process is regulated by the leaves condition and the atmospheric process. The root guides the selection, control and process of the chemical composition of the solutes and guides all this to the rest of the plant. The shoot creates specific conditions to control the absorbed solutes, transferred to the leaves area. The leaves provide gas transpiration metabolism to recover the nutritional molecules as well as the $H_2O$ and $CO_2$ molecules for the plant metabolism.

Figure 28:
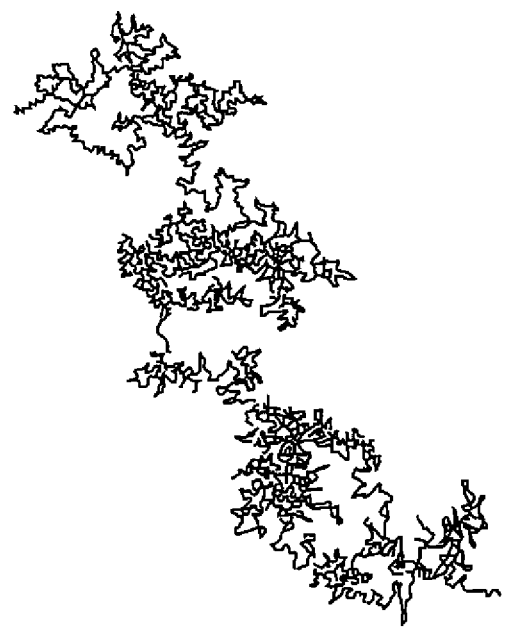
FIG. 28 illustrates atom permanent activity.

FIG. 28 illustrates chlorophyll-photons interaction. It is absolutely accepted the fact of the chlorophyll molecules are structured over the leaves area. Even though we cannot explain or understand of this structured molecule, we accept the fact that when photons are present the plant metabolism can create glucose and free oxygen from the external $CO_2$ and the water available.

We have no specific information about these processes or how any model of matrix can structure the chlorophyll molecule and how when the photons are present another matrix can structure the glucose molecule.

As this happens in the leaves area, similar activity in different plant areas is shown to create enzymes, proteins, hormones, sugars as each specific plant metabolism requires.

A balanced water source and electro-magnetic conditions is not a general rule on every area—any agricultural program will always be conditioned to the bio-chemical characteristics of each location (general climate, biotic and abiotic factors and soil molecules content.

After this physiological plant structure review, an analysis of the physics and chemistry of the molecules involved is important.

FIG. 10 is a sketch of atom structure. The upper area is to show that the external electrons move at high speed. In the sketch a hydrogen atom with only one electron is moving at that level that can be a cloud around for the speed of his movement. This will be an extra point of the analysis.

The lower area shows that there are different orbit levels with specific capacity. All the known atoms have the same elements as positive charge in the nucleus: protons and neutrons and external electrons with negative charge. The difference in all the known elements is the internal and external orbits design.

Some elements are shown for an easy understanding of the internal organization:

Hydrogen $1s^1$
Carbon $1s^2\ 2s^2p^2$
Nitrogen $1s^2\ 2s^2p^3$
Oxygen $1s^2\ 2s^2p^4$
Sulfur $1s^2\ 2s^2p^6\ 3s^2p^4$ FIG. 11 illustrates atoms orbits design. This sketch is to show the structure orbit design on every energy level. The complexity of that orbits design shows the big difference of the atoms structure as known in nature.

Figures 12A, 12B, 12C:
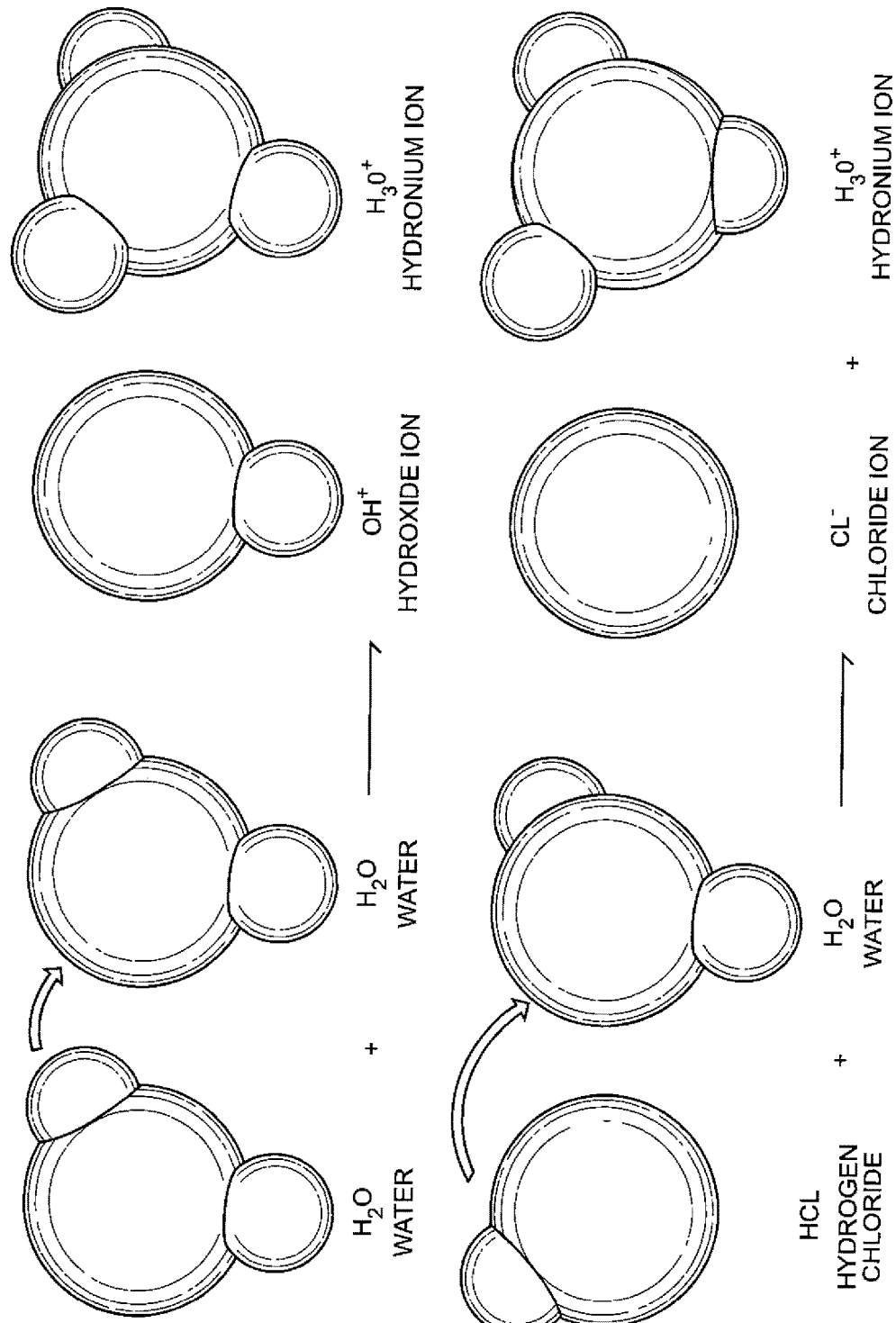
FIGS. 12A, 12B, and 12C illustrate the creation of energy bonds by donation or acceptance of external electrons.

FIGS. 12A, 12B, and 12C illustrate molecular interactions. This drawing is to show how a molecule can be transformed and divided in some other molecule or free atoms. Each of the figures shows some of these modifications.

Figure 13:
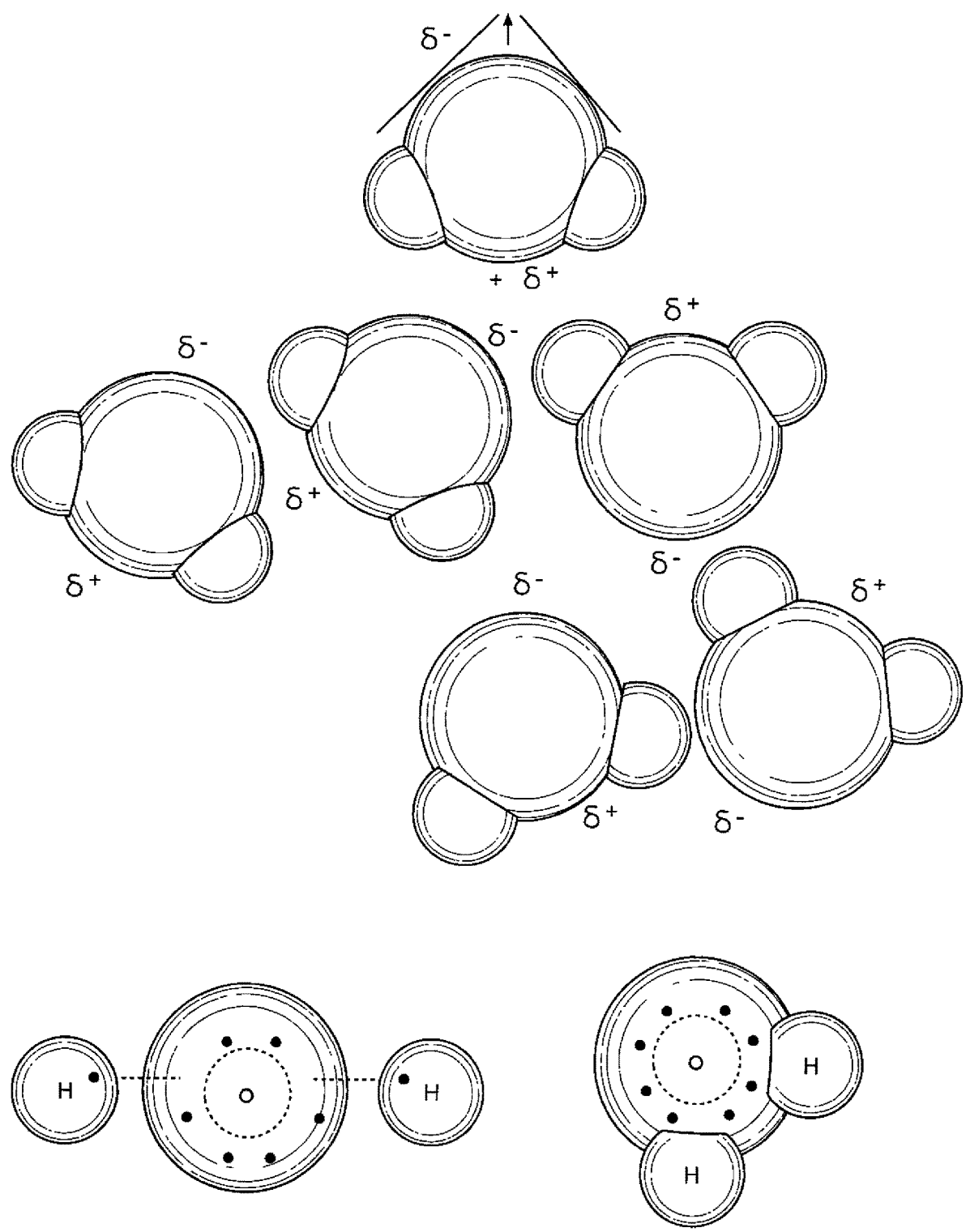
FIG. 13 illustrates dipolarity in water molecules.
Figure 27:
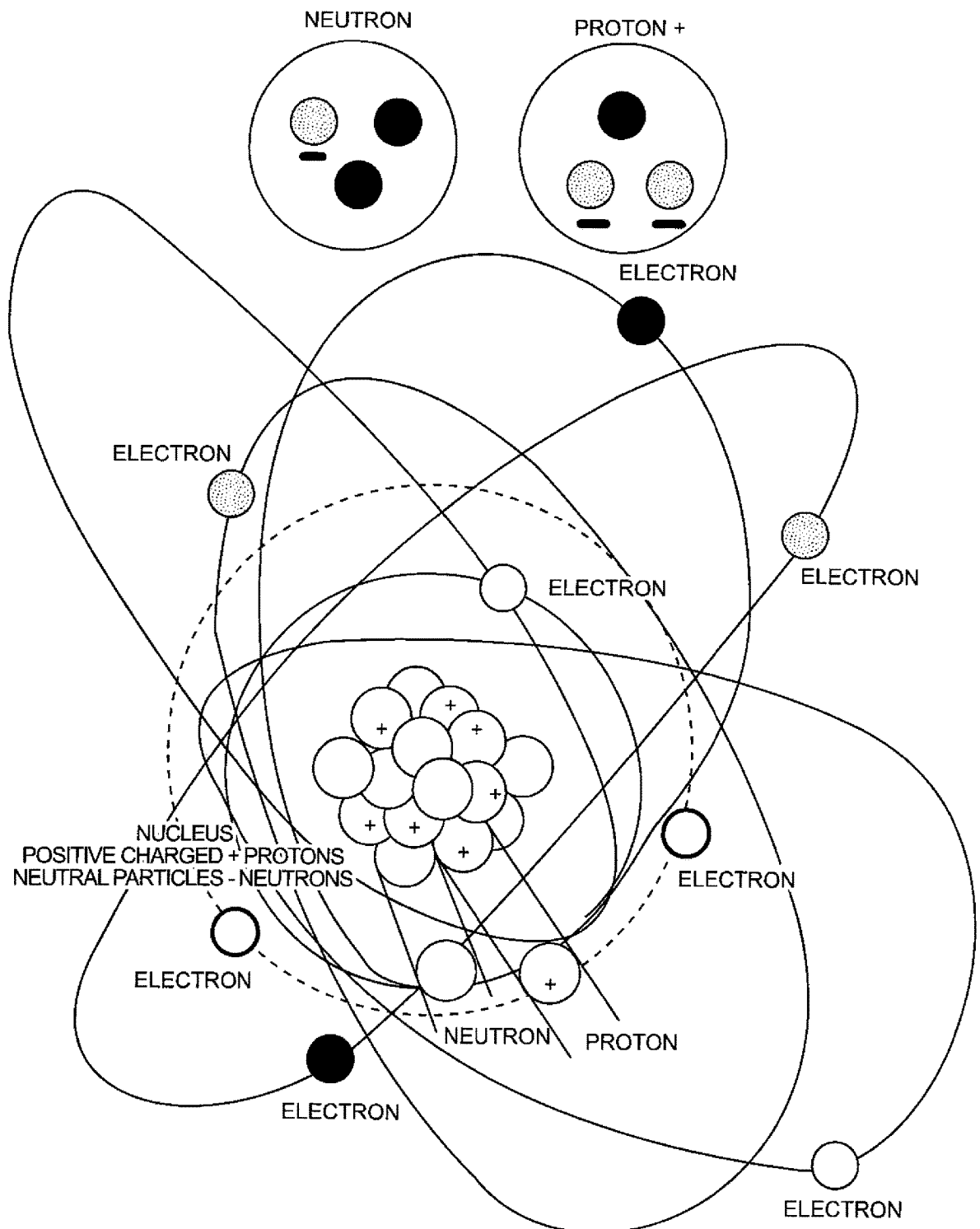
FIG. 27 illustrates the internal structure of the oxygen atom.

FIGS. 13 and 27 show the internal structure of the oxygen atom, how the electro-magnetic orientation of the internal composition reacts with similar oxygen-hydrogen molecules. The real orbital of the oxygen electrons shows how complex the mutual interaction can be. Most of the external electrons have strong capacity to interact with other atoms and molecules known as Reactive Oxygen Level (ROL).

Figure 14:
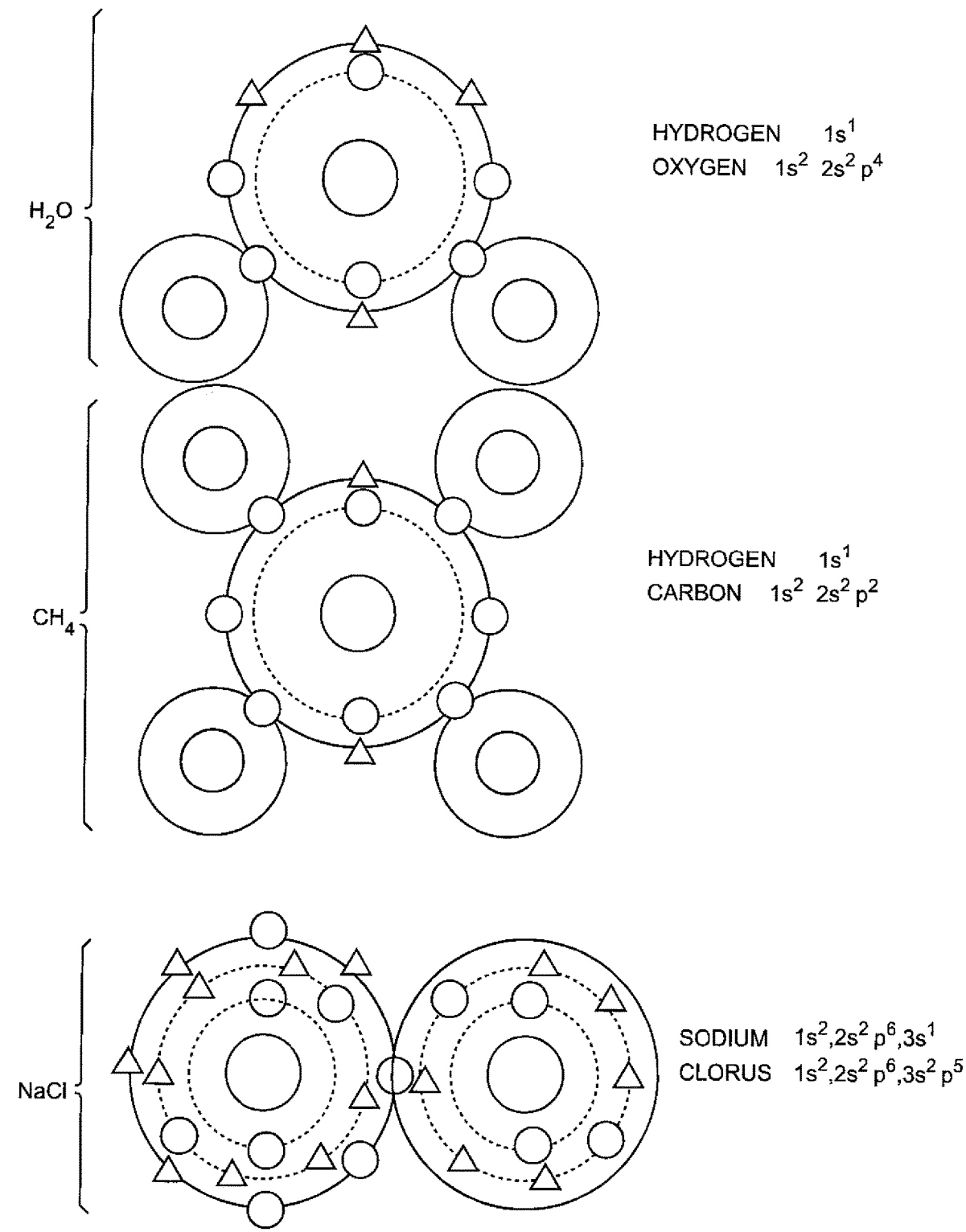
FIG. 14 illustrates the interaction between elements in NaCl, CH4, and H2O.

FIG. 14 illustrates atoms and molecules structure. These figures show each atom's interaction to form different molecules. $H_2O$ molecule interacts with every election of the atoms filing the empty places of the external orbits. Hydrogen $1s^1$ Oxygen $1s^2\ 2s^2p^4$ (2 empty areas) $CH_4$ and $NaCl$ molecules show the same pattern as each orbital details.

Figure 29:
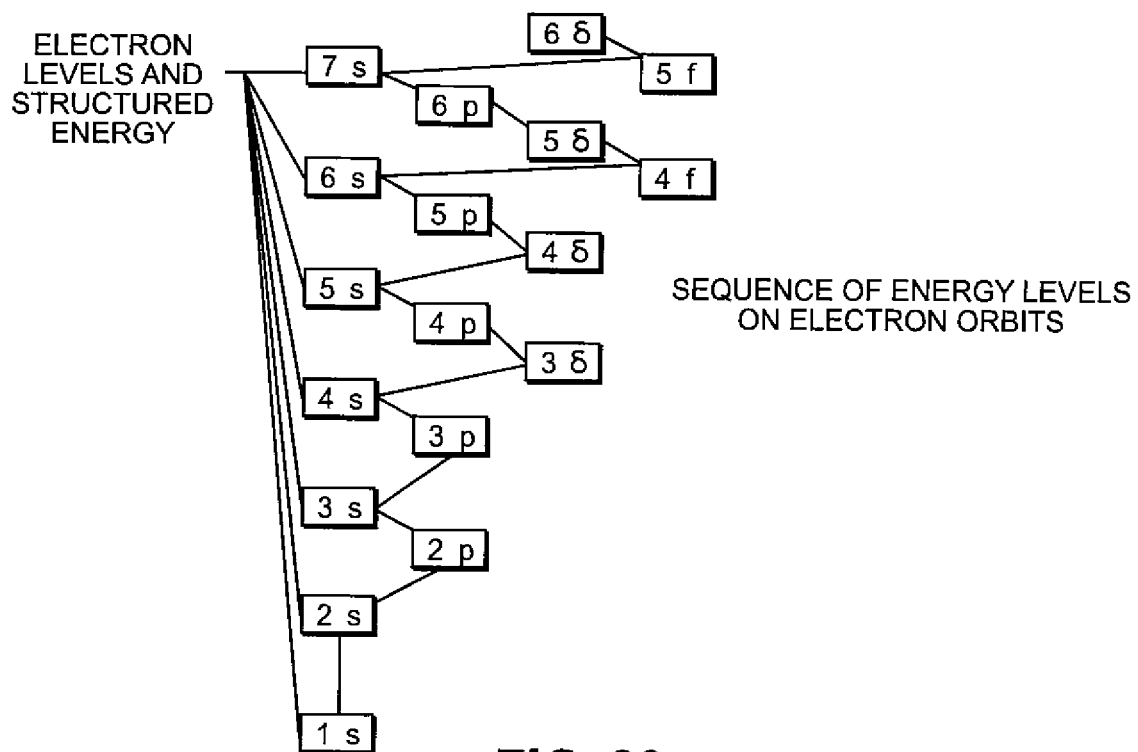
FIG. 29 illustrates the sequence of energy levels on electron orbits.

FIGS. 28 and 29 illustrate atom permanent activity: Einstein verified that all atoms (and molecules) in nature are in permanent movement as the sketch shows, and can be static when absolute 0 temperature (Kelvin index=−273° C.). This remark shows that any environment is in permanent activity moving the electromagnetic field around. In the lower area is shown the energy sequence when any electron is attempting to move and the energy required for it. The energy each plant uses is the photon permanent activity (FIGS. 18A and 18B).

FIG. 20 shows wave and lines of electron activity. Academic researchers have been involved to define the basic laws of the electrons activity. We will show some of this research as the basis of the invention. Since Faraday and Maxwell a number of theories show the electron capabilities and behavior. The first drawing shows that the energy wave can be modified when time and electromagnetic energy is present or modified (equations mentioned as reference but are the basis of the modern society: computers, radar, radio, TV communications etc.). Schrödinger uses time as basis of interactions. Feynman postulated unexpected line direction for the energy and the electromagnetic activity. At the bottom of the sketch are some lines of possible paths that any electron follow to interact with others.

Figure 31A:
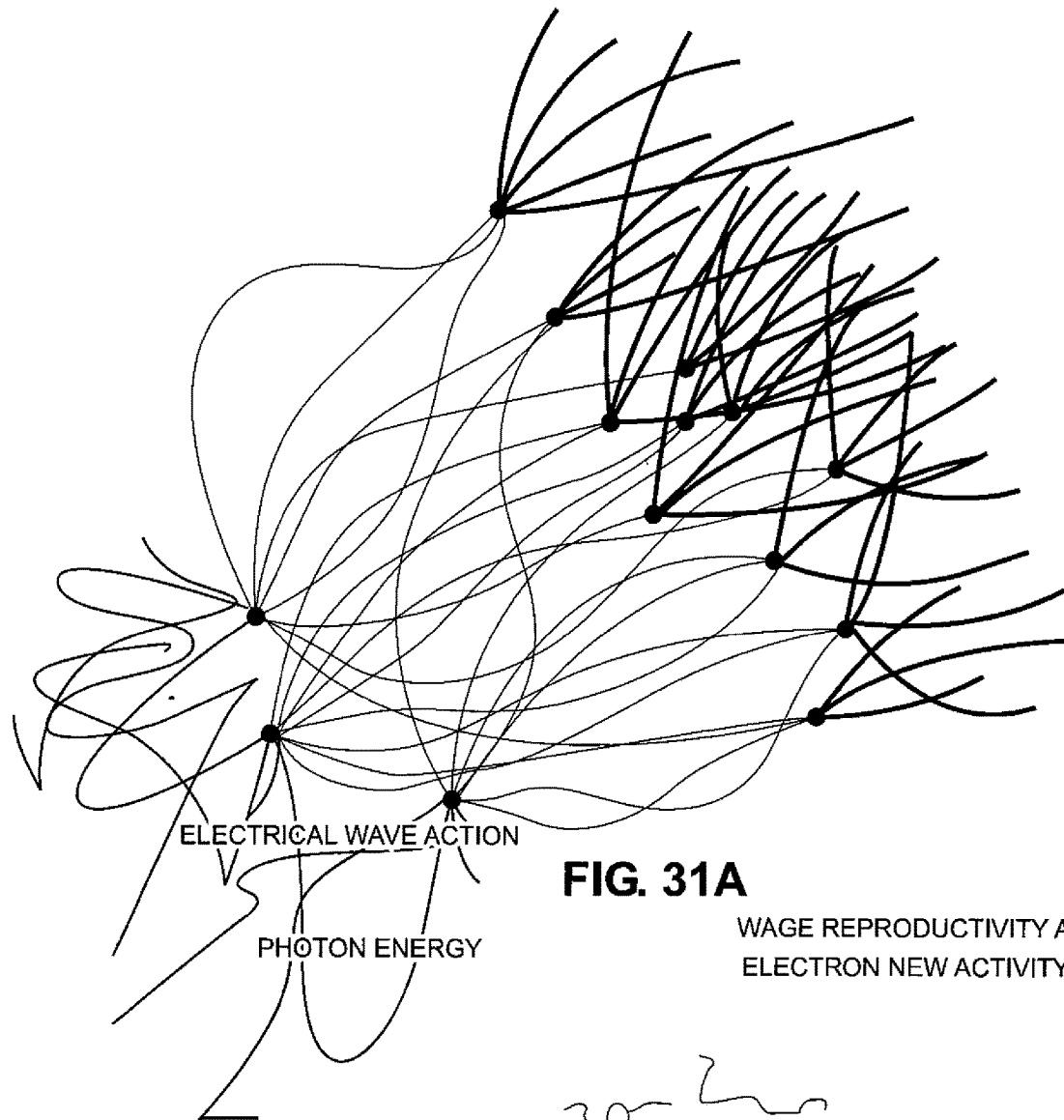
FIGS. 31A and 31B illustrate electron energy paths.
Figure 31B:
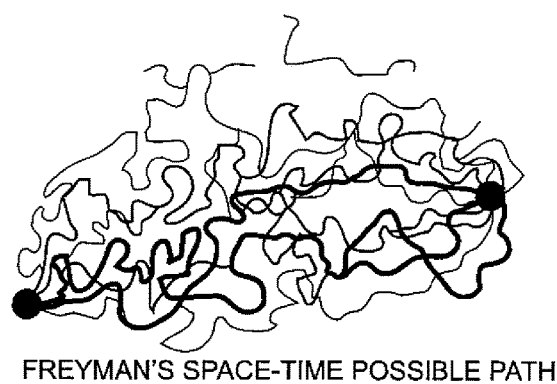

FIGS. 31A and 31B illustrate electron energy path. This to show the unpredictable wave line of energy that after photons impulse can follow and line of reaction of the affected electron. FIG. 31A is a theoretical view of this activity. FIG. 31B is the real lines of electron activity (Feynman).

Figure 32:
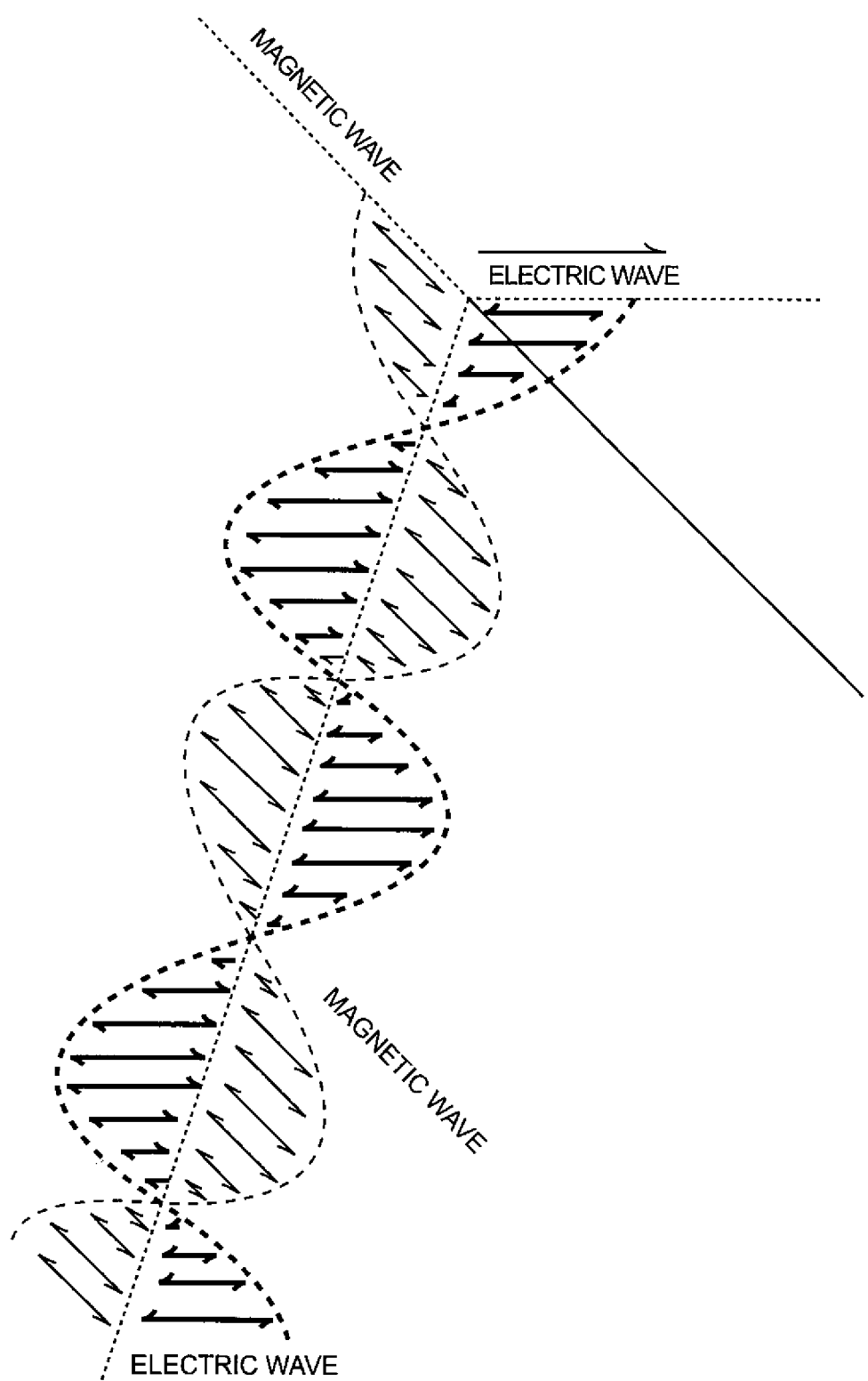
FIG. 32 illustrates the path of electrical and magnetic waves in an electromagnetic wave.

FIGS. 32, 33A, and 33B illustrate electric and magnetic waves path. These sketches show the orientation and path of the electromagnetic phenomena that affects any molecule or atom permanently. After we define the unpredictable path of the electrons behavior, we can admit the changes pending of any additional energy source, but under these data and controlled energy we can manipulate the final result we look for.

All these interactions affect the molecule behavior specially when we know that in the soil a number of elements, bacteria activity and water influence have a permanent activity, creating a specific environment with electromagnetic values. This activity is defined as redox phenomena: reduction oxidation, loss or gain external electrons in a molecular relation.

As conclusion: what we know about plants is not total comprehension, but just the best data available—that means is not apparent facts, observations or empirical data that we recorded, because our perceptions are structured by information, previous data, habits of thought, theories—always with possibility of making mistakes, until new data is available.

As mentioned previously, plants entire picture is a complex issue—and the purpose is related to analyze the nutrition and plant development.

Living individuals need nutrition and each species develops their own differentiated process for selection and ingestion, interval chemical changes, nutrients selection, and nutrients integrated, but if we modify the structure of these basic elements used as nutrients the final result (after the natural process) can be a wonder or can be fatal.

When the natural process is disturbed modern medicine can design a specific (patented) formulation of molecules to arrange the normalization needed.

The disclosure is related to the fact that the manipulation of the amount of electrons that can be added in both directions, the orientation of the total water molecules and additional activity can create a controlled electro-magnetic environment.

As the nutrition solutions are controlled (manipulated) the entire life plant path can be programed: the wake up of the seeds, the biotic-abiotic environment, the total plant development, the productive process, the fruit maturity, and the aging process, not to mention better fertilizer use.

The patent protection requested is oriented to the utility use of the academic concept and as result some prototypes can be made, adapted to the soil, external conditions, plant species.

The proficiency of the electricity is the key of our modern way of life: utilities at home, office, street, computers, communications, etc. have this common base. Energy production is beyond any imagination, since basic mechanics production until dams, nuclear, wind, sun sources are in use and some new to come.

In any case the ultimate phenomena are reduced to produce, orientation, control and electrons acceleration. A number of engines have been designed for decades for any purpose at home, office and industrial: induction engine, cronclad motor, air cooled engine, reciprocating engine, two phase motor, two pole motor, rocket engine, value-in head engine, V motor—cylinder converger, internal combustion engine, jet engine, water cooled motor, air cooled motor, explosion motor, ramjet engine, turbo-prop engine, diesel engine, out-board motor, motor-generator, single-phase motor, propulsion motor, pulse-jet engine, synchronous motor, tractor engine, etc. For any specific intention an engine can be designed.

FIGS. 15A through 16C show engine internal flux of electrons. As example of the possibilities in agriculture the sketch shows how these options can operate:

FIG. 15A.—Induction engine—a copper wire is coiled around a vacuum metal nucleus—where the electro-magnetic environment create an electron flux—our practical prototype can increase or reduce that flux on both direction with electromagnetic effect in the internal used element (in this case water).

FIG. 15B.—Toroid engine—this particular design is a copper wire coil but in circular mode creating an specific electromagnetic energy current (positive-negative path) to align the electrons current.

FIG. 15C.—Is a multiple Induction engine design in a circular path. In this option each induction coil creates its own electron-flux—but as they are sequence-aligned the electromagnetic wave creates a circular impulse (washing machine).

Figure 34A:
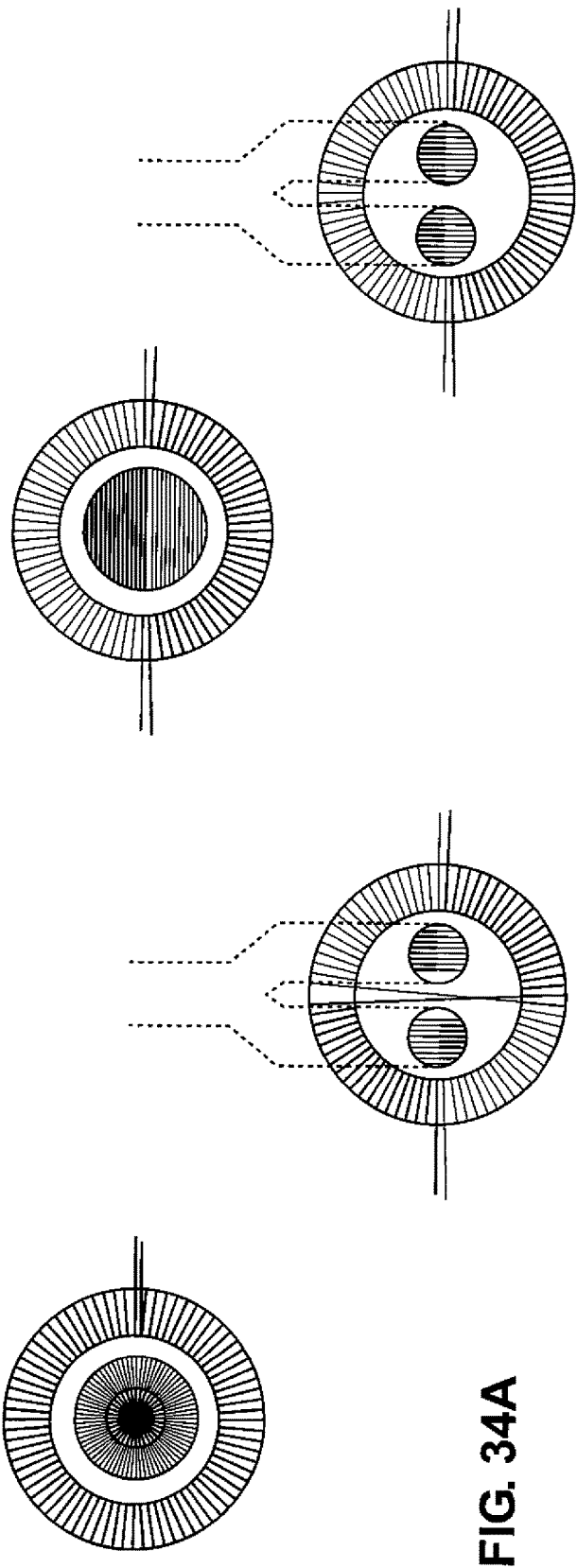
FIGS. 34A and 34B show some engine designs for electromagnetic impulse.
Figure 34B:
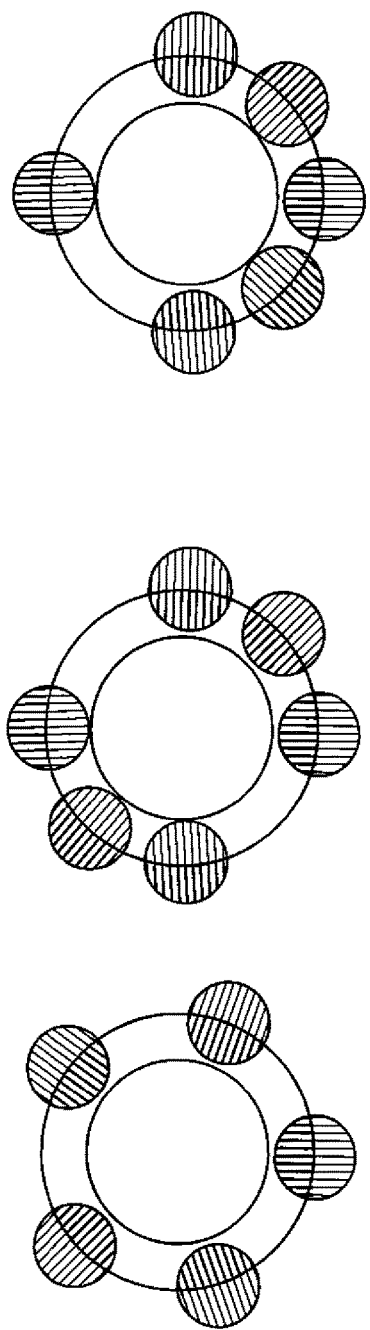

FIGS. 34A and 34B show some engine designs for electromagnetic impulse. FIG. 34A shows toroid designs with different current as result that can be used for optional purpose. FIG. 34B. shows some optional designs for the multiple induction engine where the diversity of electromagnetic waves that can be created can be observed.

Basic Considerations

The analysis of the theoretical concept is important, regardless of the physical experimentation with the prototype. This model has multiple options based on the basic concept of nature and soil composition; water and nutrient mobilization capacity; pH and salt residues, as a result of previous fertilization and use; climate and temperatures involved; and atmospheric pollution.

Electrical conduction coil design generates magnetic fields that are free electrons in a controllable and useful direction.

Plant absorption phenomenon and nutrient management is regulated by anion-cation exchange of the environment. In this process, the water and CEe and CECe capacity that it may have, represents the basic solvent-solute operation.

The plant cannot realize its development function and production (genetic option) without the previous process; nevertheless, the chemical phenomena chain that allows its development (enzymes, sugars, hormones) will always be linked to the CEe and CECe of the water and liquids involved.

The prototype consists of six (6) integrated coils with the following characteristics (2 different types): they control and rectify the voltage involved; by means of a timer, they handle the intensity of electronic fields (electron flow); they have instrumentation that allows the reverse of electron flow, conducting them in both directions; they are designed to arrange the electromagnetic orientation atoms and water molecules, as well as the resulting solutes; and they are designed to manage the electron flow activity.

The irrigation water has a CEe present flow electron capacity; and this prototype offers the possibility of manipulating them in numerous options, according to the type of crop and application period; and as a result: the harvest.

The absorption process that takes place in the plant root depends on the electronegativity of each metal and nutrients and the possibility that the solute (water) can adapt to plant needs in each phase of its life cycle.

The active involvement of this electron movement in the anion-cation absorption phenomenon and use of the soil elements and the active bacteria that make it up must be considered.

Involvement and use in the nitrogen cycle and other elements must be considered.

Programming must be according to the needs of each genetic type of plant and their adaptation to soil and climate diversity. Programming of the prototype as an example has to be prepared according to the conditions of each type of sowing and the nutritional characteristics in each stage are required; likewise, the type of soil and climate, as it happens with each region that harvests cotton.

As a result of this analysis, we can carry out tests and adapt the instrumentation offered by the prototype.

As already explained, these analyses are far-reaching, but they are the basis of their real use; especially, in regions where low productivity is transformed into serious food constraints for the population.

The main reason for this experimentation is to evaluate the mobility levels and atom conduction that delimit water composition and its affectation in the total agricultural processes.

The real expectations of agriculture summarize a complicated network of factors that can be analyzed in stages, including the probiotic quality of the soil; the porosity and chemical composition of the soil; the residues of previous harvests: affectation and salts residues, and resulting pH; the general weather and predictable visibility; pollution; and the quality and volume of water.

Considerations (basis and target handle) include elemental atom composition that is included in this study (Elemental Composition table below—the location of the external orbit allows us to estimate the location in the basic oxidation-reduction processes, that is, solute formation); consideration for agricultural effects of the elements that are considered nutrients (macro-micro) and appropriate ion availability (FIGS. 22-24 and Nitrogen Activity table below); ideal percentages for the ideal harvest (FIG. 22); importance in atomic structure and nitrogen activity (Nitrogen Activity table below); importance of evaluating and classifying the composition and condition of the soil porosity (ROS>Oxygen Reactivity) (FIG. 21); evaluation of the residual chemical composition of the soil and electromagnetic ductility; and regular water composition for agricultural use with its multiple options—electrostatic reality and residual activity that will affect the elements that can become useful solutes to plants and their productive capacity.

The basis of this analysis lies in the basic principle that the composition in atom volume can influence, and if necessary, modify if subjected to a strong electron tide in a positive or negative direction (electron flow activity).

The possibility of altering (under control) the physio-chemical-electromagnetic characteristic of these elements is a practice with the hopes of managing the total process of agriculture. Embodiments of the engine include an engine that when creating a determined electromagnetic field can face or add free electrons—there is adaptation in order to increase or decrease the flow, as well as to reverse the direction flow; a toroid with peripheral magnetic field that allows aligning the electromagnetic orientation of the material (liquid, solid, gas); and multiple engines that creates a circular current for the activation or reduction. The turning pressure or reverse can be increased.

This prototype will allow evaluating each stage and preparing the operation of the crops. It has an independent operation in each case.

The second prototype has the three series linked for direct operation, although an evaluation of the other external conditions is suggested.

CE-CEC Activity

This evaluation will give the option of detailed analysis according to the genetic characteristics of the treated crops and will allow planning the crops according to the external conditions.

The evaluation of the biological processes is an option for a future generation of nutrients.

The conditions of the use of water can be evaluated and its practical utility can be programed.

The improvement and recovery of the soil with excesses and surpluses of non-assimilated previous fertilizers and those with altered pH can be controlled.

The studies to evaluate and control the activity of the internal molecular phenomena will be the basis to define the best growth, development, harvest, and survival conditions of the plants, as well as the qualities of the harvest.

Verifying the conditions of genetic manipulation (Monsanto-Bayer, Dow Chemical, etc.) and controlling its impact on the direct or secondary consumption population (consumer animals), will be more accessible and controllable.

| A.N. | | ELEMENTAL COMPOSITION | |
|---|---|---|---|
| 7 | N | $1s^2 2s^2 p^3$ | $(-3 \leq +5)$ |
| 1 | H | $1s^1$ | $(-1 \leq +1)$ |
| 15 | P | $1s^2 2s^2 p^6 3s^2 p^3$ | $(-3, +3, +5)$ |
| 8 | O | $1s^2 2s^2 p^4$ | $(-2, -1, +2)$ |
| 20 | Ca | $1s^2 2s^2 p^6 3s^2 p^6 4s^2$ | $(+2)$ |
| 12 | Mg | $1s^2 2s^2 p^6 3s^2$ | $(+2)$ |
| 19 | K | $1s^2 2s^2 p^6 3s^2 p^6 4s^1$ | $(+1)$ |
| 16 | S | $1s^2 2s^2 p^6 3s^2 p^4$ | $(-2, +2, +4, +6)$ |
| 6 | C | $1s^2 2s^2 p^2$ | |
| 5 | B | $1s^2 2s^2 p^1$ | $(+3)$ |
| 17 | Cl | $1s^2 2s^2 p^6 3s^2 p^5$ | $(-1, +1, +3, +4, +5, +7)$ |
| 29 | Cu | $1s^2 2s^2 p^6 3s^2 p^6 d^{10} 4s^1$ | $(+1, +2)$ |
| 26 | Fe | $1s^2 2s^2 p^6 3s^2 p^6 d^6 4s^2$ | $(+2, +3)$ |
| 25 | Mn | $1s^2 2s^2 p^6 3s^2 p^6 d^5 4s^2$ | $(+2, +4, +7)$ |
| 42 | Mo | $1s^2 2s^2 p^6 3s^2 p^6 d^{10} 4s^2 p^6 d^5 5s^1$ | $(+2, +3, +4, +5, +6)$ |
| 28 | Ni | $1s^2 2s^2 p^6 3s^2 p^6 d^8 4s^2$ | $(+2, +3)$ |
| 30 | Zn | $1s^2 2s^2 p^6 3s^2 p^6 d^{10} 4s^2$ | $(+2)$ |
| 14 | Si | $1s^2 2s^2 p^6 3s^2 p^2$ | $(-4, +2, +4)$ |
| 11 | Na | $1s^2 2s^2 p^6 3s^1$ | $(+1)$ |
| 17 | Cl | $1s^2 2s^2 p^6 3s^2 p^5$ | $(-1, +1, +3, +4, +5, +7)$ |

| NITROGEN ACTIVITY → OXIDATION DEGREE | | |
|---|---|---|
| +5 | $HNO_3$ | Nitric Acid |
| +4 | $NO_2$ | Nitrogen Dioxide |
| +3 | $HNO_2$ | Nitrous Acid |
| +2 | NO | Nitric Oxide |
| +1 | $N_2O$ | Nitrous Oxide |
| -1 | $N_2H_2$ | Diimide |
| -2 | $N_2H_4$ | Hydrazine |

| NITRITE | → Reduction cap |
|---|---|
| NITRATE | |
| AMMONIUM | |
| Inorganic Nitrogen | → Activity by electron |
| Dehydrogenase | |
| Nitrogenase | |
| Urease | |

Nitrification is performed by soil bacteria, but the process results in residual soil acidity. When ammonium ions are transformed to nitrate, $H^+$ IONS are released. Ammonium and oxygen in the presence of nitrifying bacteria are transformed into nitrate, hydrogen, and water:

$$NH^4 + 2O_2 \longrightarrow NO_3^- + 2H^+ + H_2O$$

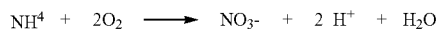

Common fertilizer with acidic residual include ammonia, ammonium sulfate, ammonium nitrate, and urea.

Nitrate sources with no acidic residual include calcium nitrate and potassium nitrate.

How to Neutralize Acidity

In a soil mix colloid, the addition of calcium carbonate:

In a soil mix colloid, the addition of calcium sulfate:

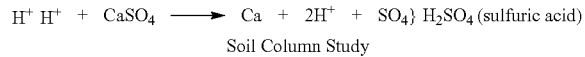

Soil Column Study

The following outlines an exemplary study useful for determining soil impacts of water treated with the present invention and estimating parameters for use with an engine of the present invention.

The soil columns are clear acrylic tubes 4 inches (10 cm) diameter and 24 inches (61 cm) in length, with caps on each end, which are suspended vertically to allow for flow of water. The apparatus used to hang the columns is stored in an indoor storage building connected to the building's earth ground with a multi-strand electrical cable to ensure safety (if electrical power is used).

A "Hanford Sandy Loam" will be used for this study. Soil location is known to have a bulk density of approximately 1.5 g/cm³. The collected soil will be analyzed for particle size (amount of sand, silt, and clay), pH, and ECe before loading into the columns.

The soil will be dried at 105° C., then ground and sieved through a 2 mm screen. The sieved soil will then have water added to it to increase the volumetric water content of the soil to approximately 6%. At this point, the moist soil will be packed into the soil columns to a depth of 12 inches (30.5 cm) at a bulk density of 1.5 g/cm³. A total of 18 columns will be used in the study.

For the study, nine "treated" columns will receive experimentally treated water and nine "control" columns will receive non-treated water. An amount of water equivalent to one acre/inch, (200 ml) will be added to each of the columns two times each week, for the length of the experiment. The leachate will be collected the following day (~24 hrs. later) and the volume will be recorded. Leachate will be analyzed for pH and ECe.

The experiment will run for three weeks. Each week of the study three treated and three un-treated soil columns will be removed from the soil column apparatus, six columns in total will be removed each week. This will allow for analysis of changes in the soil after 2, 4, and 6 acre/inches of water have passed through the soil. Each of the columns will have soil samples taken from the contents, and then each will be analyzed for volumetric water content, pH and ECe.

Suggested Theoretical Analysis Prior to the Practical Application

Objective #1: Determine the impact and activity that nitrogen and its derivatives signify for the environment: nutrients and practical effects; identify crops.

Objective #2: Determine the quantum alteration and modification in the nitrogen atom when subjected to pulsating electron currents, as well as its affectation on the support capacity of nutrients and molecules: crops.

Objective #3: Determine the impact on physiochemical soil characteristics regarding agriculture in general and in local identified crops.

Nitrogen—Oxidation Degree:

| Electronegativity | Molecule | Identification Name |
|---|---|---|
| +5 | HNO$_3$ | Nitric Acid |
| +4 | NO$_2$ | Nitrogen Dioxide |
| +3 | HNO$_2$ | Nitrous Acid |
| +2 | NO | Nitric Oxide |
| +1 | N$_2$O | Nitrous Oxide |
| −1 | N$_2$H$_2$ | Diimide |
| −2 | N$_2$H$_4$ | Hydrazine |
| −3 | NH$_3$ | Ammonia |

Bio-edaphic parameters are inorganic nitrogen, dehydrogenase, nitrogenase, urease. Soil reduction potential: nitrite, nitrate, ammonium.

Objective #4: Examine the effectiveness and testing of engine design in nitrogen atom modification and its impact on soil before, during, and after each crop development period. Provide evaluation of selected crops.

Objective #5: Evaluate soil variations according to the salt contamination degree, contamination in the water recovery process, and contamination by chemical residues of fertilizers and pesticides.

ROS [Radioactive Oxygen Species]

| Types | Structure | ID | Reactivity |
|---|---|---|---|
| Singlet oxygen | O$_2$ (O=O) | Radical | High |
| Superoxide | O$_2^-$ (:O:O:) | Radical | Medium |
| Hydrogen Peroxide | H$_2$O$_2$ (H:O—O:H) | Non Radical | Low |
| Hydroxyl Radical | HO$^-$ (H:O•) | Radical | Very High |
| Hydronium Ion | H$_3$O$^+$ (H•H•H:O) | Radical | |

Objective #6: Provide analysis of the chemical content in the soil before, during, and after each crop period: rebirth of seed (tree and perennial production cycle); first growth period of the plant (beginning of the reproductive process in trees and perennials); flowering period; maturing and harvesting period; soil recovery period; periodic watering impact: retention, waste; biotic waste and fauna; and:

| | |
|---|---|
| H$_2$O | NCO$_3$ |
| NO$_3$ | NH$_3$ |
| NH$_4$ | Sucrose |
| SO$_4$ | |
| H•O•K•Na•Cl•N•S•Mg•B•As•Li | |
| Se•S•P•Co•Ni•Si | |
| Ca•Cr•Co | |

Phase 2

Objective #1: Devise equipment adjustment for the use of soil identification characteristics so as to correct the refractive index, water polarity due to porosity effects or specific composition.

Objective #2: Determine the impact and affectation of soil identification characteristics after the use of non-processed natural nutrients proceeding from organic or inorganic origin. Evaluate the modifications registered according to the crops under examination. Evaluate crops whose chemical information and development periods can be determined in accordance with the resulting chemical modifications and conditions: cotton, tobacco, legumes, basic grains, fruit crops, sugarcane, and avocado.

Objective #3: Evaluate the balance in the suggested energy levels congruent with the reference equipment.

Objective #4: Provide analysis and evaluation for publication and/or contribution.

What is claimed is:

1. A process for altering plant performance, comprising:
providing an apparatus, comprising:
- soil having nutrients, the soil providing a location for the growth of a root system of a plant;
- an engine comprising one or more integrated coils, a timer, and an irrigation tube,
- wherein the apparatus is connected to an earth ground through a multi-strand electric cable;

causing water to flow through the engine through the irrigation tube;

with the engine, altering the intensity of electrical fields according to the timer;

with the engine, changing the direction of electron flow in water molecules of the water passing through the irrigation tube; and transporting the water to the soil, wherein the engine manages electron flow activity for guiding absorption-transport activity of the plant by altering the present flow electron capacity of molecules of the water, thereby changing its ability to electrically and chemically interact with the nutrients.

2. The process for altering plant performance as recited in claim 1, wherein the apparatus is programmable to account for plant type, soil type, climate, and nutritional characteristics required in each stage of plant growth.

3. The process for altering plant performance as recited in claim 2, further comprising the step of programming the apparatus for a predetermined plant type and soil type.

4. The process for altering plant performance as recited in claim 1, wherein the engine comprises six integrated coils.

5. The process for altering plant performance as recited in claim 1, wherein the engine is a solenoid induction engine.

6. The process for altering plant performance as recited in claim 1, wherein the engine is a toroid engine.

7. The process for altering plant performance as recited in claim 1, wherein the engine comprises a multiple induction engine configured to create an internal circular flow of electrons.

8. The process for altering plant performance as recited in claim 1, further comprising additional engines to form a combination of engines for guiding absorption-transport activity of a plant.

* * * * *